(12) United States Patent
Winter et al.

(10) Patent No.: US 12,153,427 B2
(45) Date of Patent: Nov. 26, 2024

(54) SYSTEMS, METHODS, AND APPARATUS FOR USING REMOTE ASSISTANCE TO ANNOTATE IMAGES OF AN ENVIRONMENT

(71) Applicant: Waymo LLC, Mountain View, CA (US)

(72) Inventors: Collin Winter, San Francisco, CA (US); Vishay Nihalani, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 381 days.

(21) Appl. No.: 17/558,088

(22) Filed: Dec. 21, 2021

(65) Prior Publication Data

US 2023/0195107 A1 Jun. 22, 2023

(51) Int. Cl.
*G05D 1/00* (2024.01)
*G06T 7/70* (2017.01)
(Continued)

(52) U.S. Cl.
CPC ............ *G05D 1/0038* (2013.01); *G06T 7/70* (2017.01); *G06V 20/58* (2022.01); *H04W 4/40* (2018.02);
(Continued)

(58) Field of Classification Search
CPC .......... G05D 1/0038; G05D 1/00; G06T 7/70; G06T 2200/24; G06T 2207/30261;
(Continued)

(56) References Cited

U.S. PATENT DOCUMENTS 9,104,202 B2   8/2015   Pack et al.
9,547,989 B2   1/2017   Fairfield et al.
(Continued)

OTHER PUBLICATIONS

"Far and away: Remote drivers monitorautonomous vehicles", Oct. 22, 2019 Terry Costlow, Teleoperations handle tricky driving situations, https://www.sae.org/news/2019/10/remote-drivers-monitor-autonomous-cars, pp. 1-3.
(Continued)

*Primary Examiner* — Yonel Beaulieu
(74) *Attorney, Agent, or Firm* — McDonnell Boehnen Hulbert & Berghoff LLP

(57) ABSTRACT

Example embodiments relate to techniques for enabling one or more systems of a vehicle (e.g., an autonomous vehicle) to request remote assistance to help the vehicle navigate in an environment. A computing device may be configured to receive a request for assistance from a vehicle. The request may include an image frame representative of a portion of an environment. The computing device may also be configured to initiate display of a graphical user interface to visually represent the image frame. Further, the computing device may determine a bounding region for the image frame. The bounding region may be associated with one or more objects in the image frame. Additionally, the computing device may be configured to receive, via the GUI, an input that includes an object identifier, and associate the object identifier with each of the one or more objects in the bounding region.

20 Claims, 14 Drawing Sheets

(51) Int. Cl.
*G06V 20/58* (2022.01)
*H04W 4/40* (2018.01)

(52) U.S. Cl.
CPC ...... *G06T 2200/24* (2013.01); *G06T 2207/30261* (2013.01); *G06T 2210/12* (2013.01)

(58) Field of Classification Search
CPC .... G06T 2210/12; G06V 20/58; G06V 10/25; G06V 20/70; H04W 4/40
See application file for complete search history.

(56) References Cited

U.S. PATENT DOCUMENTS

| | | | |
|---|---|---|---|
| 9,690,290 B2 | 6/2017 | Prokhorov | |
| 9,767,369 B2 | 9/2017 | Furman et al. | |
| 9,855,658 B2* | 1/2018 | Babu | B25J 9/1694 |
| 10,755,099 B2* | 8/2020 | Lin | G06V 10/82 |
| 10,990,094 B2 | 4/2021 | Ross et al. | |
| 2016/0271796 A1* | 9/2016 | Babu | B25J 9/1664 |
| 2018/0334099 A1 | 11/2018 | Gao et al. | |
| 2019/0163176 A1 | 5/2019 | Wang et al. | |
| 2020/0041995 A1 | 2/2020 | Quillin | |
| 2020/0151448 A1* | 5/2020 | Lin | G06V 10/82 |
| 2020/0293065 A1 | 9/2020 | Pedersen et al. | |
| 2020/0338983 A1 | 10/2020 | Alalao | |
| 2020/0348691 A1 | 11/2020 | Fairfield et al. | |
| 2021/0227126 A1* | 7/2021 | Se | H04N 23/61 |
| 2022/0084279 A1* | 3/2022 | Lindmeier | G06F 3/017 |
| 2023/0195107 A1* | 6/2023 | Winter | G06V 20/58 701/2 |
| 2023/0213646 A1* | 7/2023 | John Wilson | G06V 10/25 342/179 |

OTHER PUBLICATIONS

Mutzenich et al., "Updating our understanding of situation awareness in relation to remote operators of autonomous vehicles", Cognitive Research: Principles and Implications, (2021)6:9, 17 pages.

* cited by examiner

SYSTEMS, METHODS, AND APPARATUS FOR USING REMOTE ASSISTANCE TO ANNOTATE IMAGES OF AN ENVIRONMENT

BACKGROUND

This background description is provided for the purpose of generally presenting the context of the disclosure. Unless otherwise indicated herein, material described in this section is neither expressly nor impliedly admitted to be prior art to the present disclosure or the appended claims.

Vehicles may be used to complete various types of tasks, including object and human transportation. With advances in technology, some vehicles are configured with systems that enable the vehicles to operate in a partial or fully autonomous mode. When operating in a partial or fully autonomous mode, some or all of the navigation aspects of vehicle operation are controlled by a vehicle control system rather than a traditional human driver. Autonomous operation of a vehicle may involve systems sensing the vehicle's surrounding environment to enable a computing system to plan and safely navigate.

SUMMARY

Example embodiments described herein relate to techniques for enabling one or more systems of a vehicle (e.g., a partially or autonomous vehicle) to request remote assistance to help the vehicle navigate in an environment. The techniques may enable a remote assistant (e.g., a human assistant or a computer assistant) to assist the vehicle systems in navigating conditions and situations that may be encountered along a travel route (e.g., road conditions, traffic conditions, obstacles, etc.). During the operation of the vehicle, a vehicle system may detect objects along or near the travel route of the vehicle and may request assistance from a remote assistant for identifying the objects. The remote assistant may determine the type of object and may send the object type to the vehicle systems to assist the vehicle navigate in the environment.

In one aspect, an example apparatus is provided. The apparatus may include a memory and a computing device. The computing device may be configured to receive a request for assistance from a vehicle. The request may include an image frame representative of a portion of an environment. The computing device may also be configured to initiate display of a graphical user interface at a display device. The graphical user interface may be configured to visually represent the image frame. Further, the computing device may determine a bounding region for the image frame. The bounding region may be associated with one or more objects in the image frame. Additionally, the computing device may be configured to receive, via the GUI, an input that includes an object identifier and to associate the object identifier with each of the one or more objects in the bounding region. The computing device may further generate a response that includes the object identifier for each of the one or more objects in the bounding region and transmit the response to the vehicle.

In another aspect, an example method is provided. The method may comprise receiving a request for assistance from a vehicle operating in an environment. The request may include an image frame representative of a portion of the environment. The method may also comprise, responsive to receiving the request for assistance, initiating display of a graphical user interface (GUI) at a display device. The graphical user interface may be configured to visually represent image data of the image frame. Further, the method may comprise determining a bounding region for the image frame. The bounding region may be associated with one or more objects in the image frame. Additionally, the method may comprise receiving an input that includes an object identifier and associating the object identifier with each of the one or more objects in the bounding region. The method may further comprise generating a response that includes the object identifier for each of the one or more objects in the bounding region and transmitting the response to the vehicle.

In still another aspect, a non-transitory computer-readable medium storing instructions is provided that, when the instructions are executed by one or more processors, causes the one or more processors to perform operations. The operations may include receiving a request for assistance from a vehicle operating in an environment. The request may include an image frame representative of a portion of the environment. The method may also include, responsive to receiving the request for assistance, initiating display of a graphical user interface (GUI) at a display device. The graphical user interface may be configured to visually represent image data of the image frame. Further, the method may include determining a bounding region for the image frame. The bounding region may be associated with one or more objects in the image frame. Additionally, the method may include receiving an input that includes an object identifier and associating the object identifier with each of the one or more objects in the bounding region. The method may further include generating a response that includes the object identifier for each of the one or more objects in the bounding region and transmitting the response to the vehicle.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
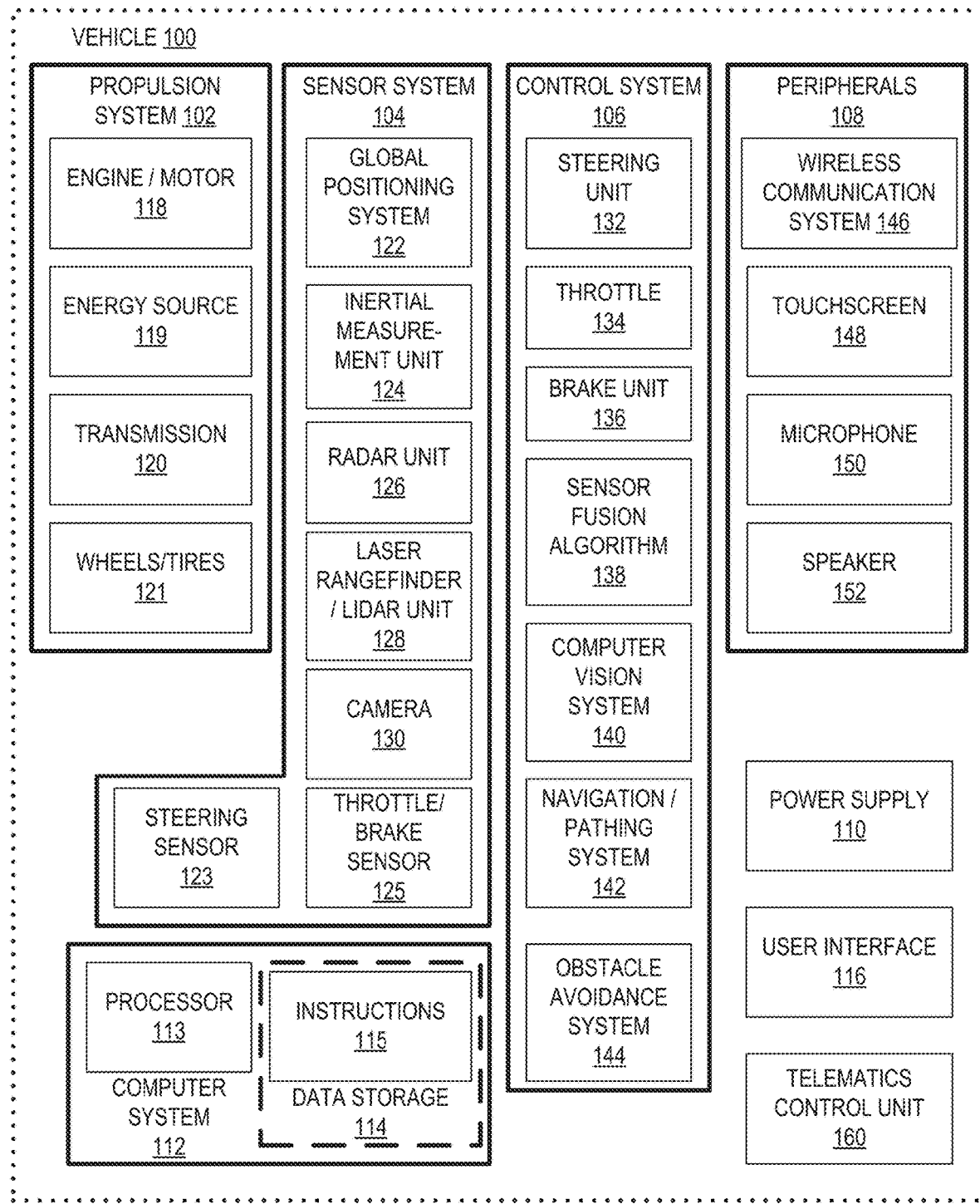
FIG. 1 is a functional block diagram illustrating a vehicle, according to example implementations.
Figure 2A:
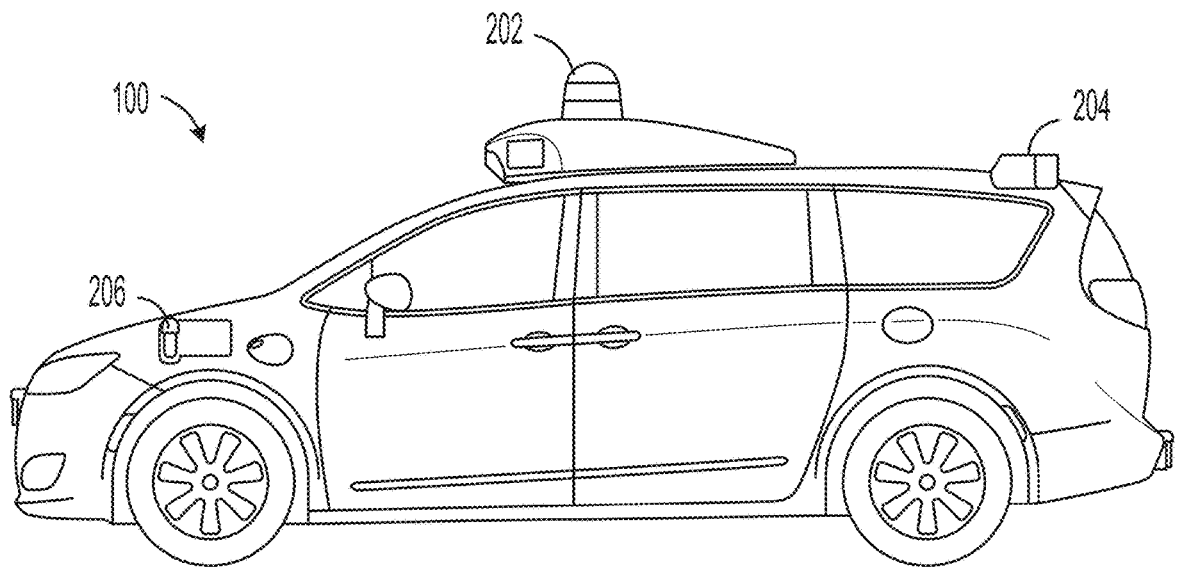
FIG. 2A illustrates a side view of a vehicle, according to one or more example embodiments.
Figure 2B:
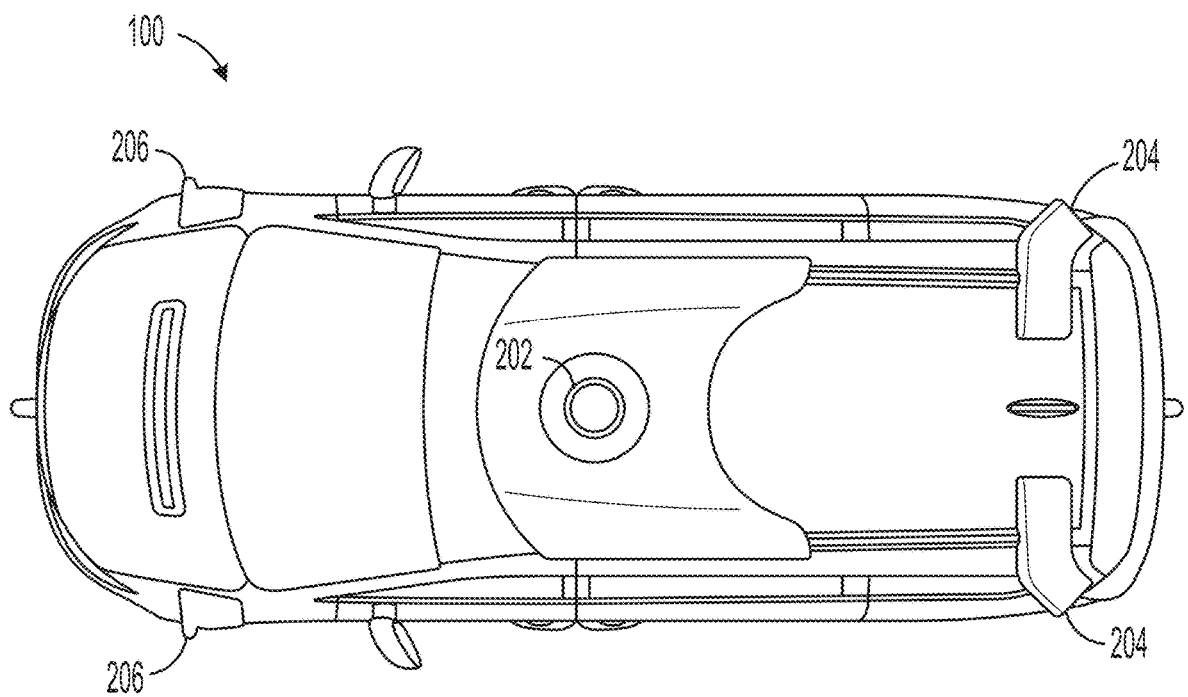
FIG. 2B illustrates a top view of a vehicle, according to one or more example embodiments.
Figure 2C:
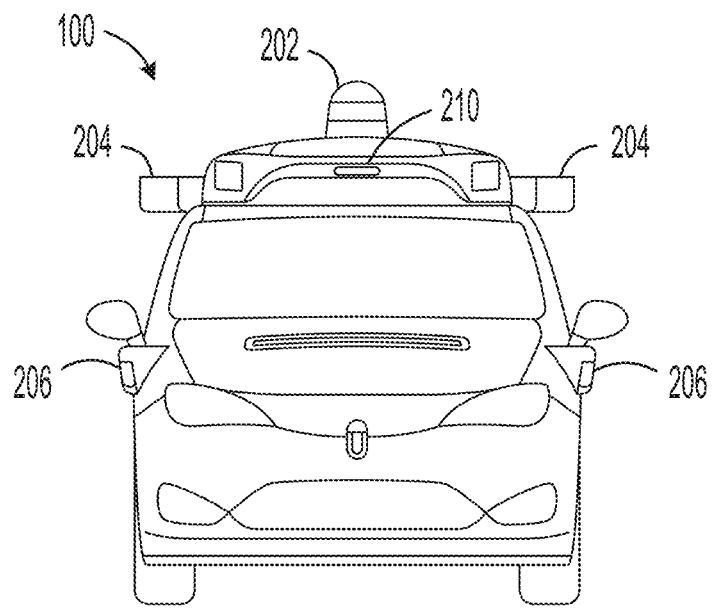
FIG. 2C illustrates a front view of a vehicle, according to one or more example embodiments.
Figure 2D:
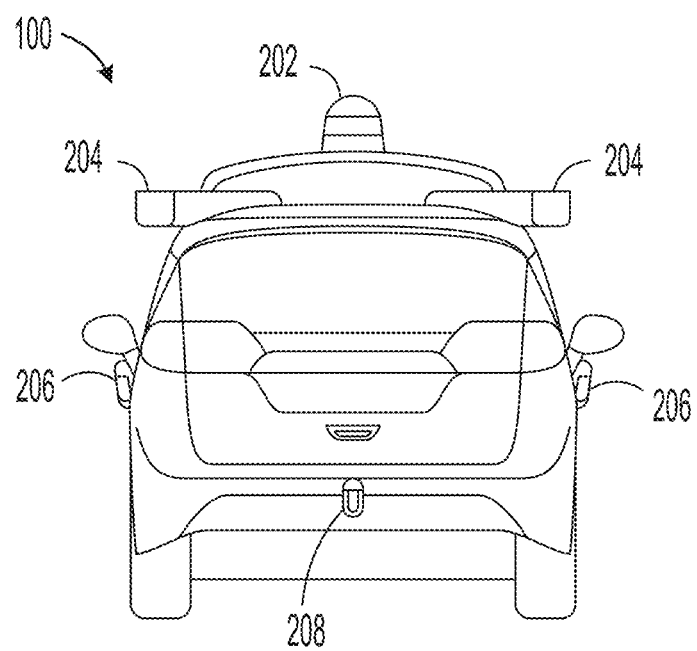
FIG. 2D illustrates a back view of a vehicle, according to one or more example embodiments.
Figure 2E:
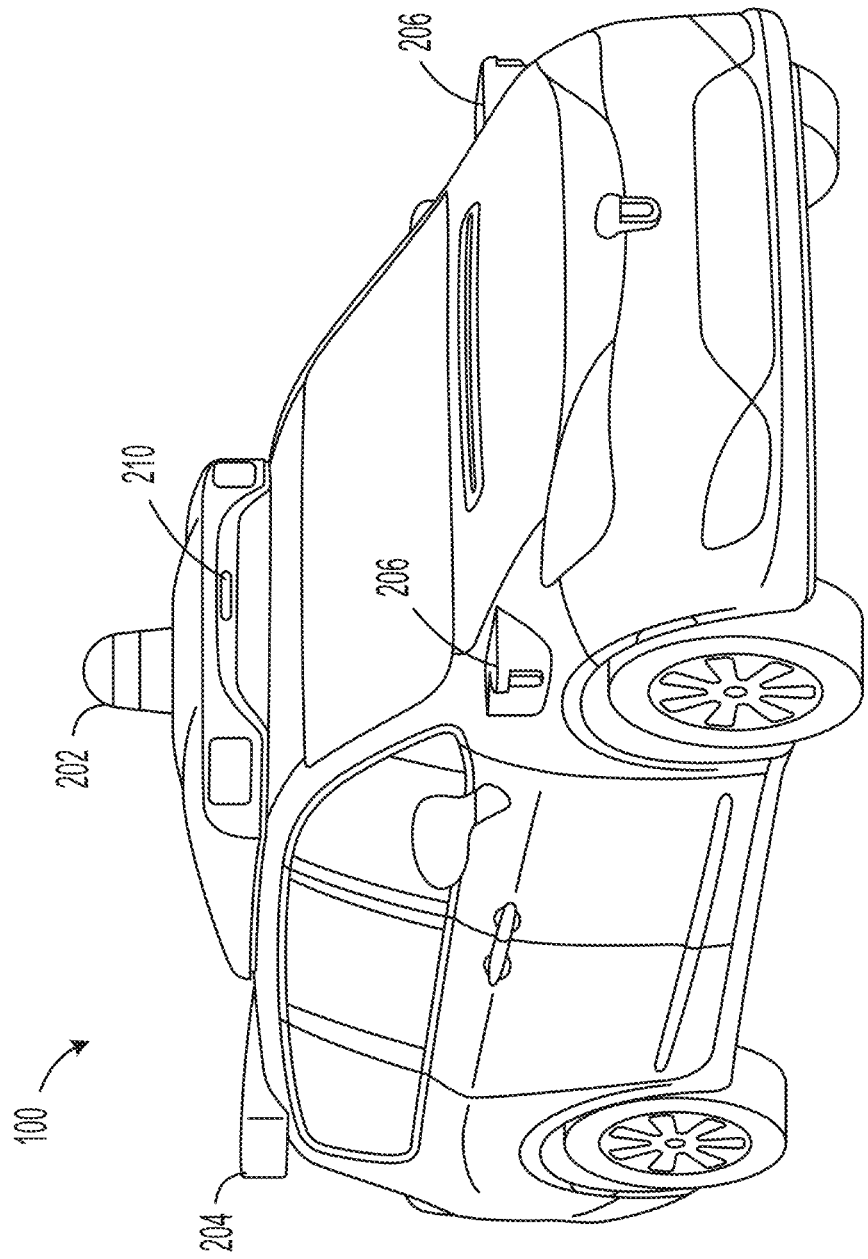
FIG. 2E illustrates an additional view of a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Advancements in computing, sensors, and other technologies have enabled vehicles to navigate autonomously between locations without requiring input from a driver. By processing measurements of the surrounding environment from vehicle sensors in near real-time, an autonomous vehicle can transport passengers or objects between locations while avoiding obstacles, obeying traffic requirements, and performing other necessary actions that are typically conducted by a driver. The shift of control of the vehicle over to a vehicle control system can permit passengers to devote their attention to tasks other than driving.

During operation, a vehicle capable of autonomous or semi-autonomous operations may encounter complex or unexpected situations that can interfere with the vehicle's current navigation strategy. In some cases, a vehicle's sensor system may detect the presence of one or more unexpected situations or obstacles that can limit the current navigation plan of the vehicle. Without a human driver to interpret the situation, the vehicle may remain stopped as a default until obtaining enough measurements of environment changes that enable safely proceeding. In some instances, however, the vehicle may remain stopped for a substantial amount of time if the environment remains static and vehicle systems are not able to identify a safe strategy for further navigation.

Because autonomous vehicles may navigate in various locations, there are numerous situations that may cause navigation issues for the vehicle navigation system and/or other vehicle systems. For example, a parking lot may include parked vehicles, pedestrians, shopping carts, and other potential obstacles that can interfere with an autonomous vehicle's ability to navigate per the lines and rules of the parking lot. In some cases, the navigation system of an autonomous vehicle may become temporarily stranded if too many obstacles interfere with potential routes. Similarly, encountering an accident between other vehicles or road construction are other example scenarios that may unexpectedly disrupt an autonomous vehicle's path of navigation. These are just a few examples where the current navigation strategy for an autonomous vehicle may be impacted and potentially limited in some way.

When a vehicle encounters a situation or obstacle where the vehicle systems enabling autonomous operation may benefit from additional assistance, one or more of the vehicle systems may request remote assistance to help overcome the situation or obstacle. A request for assistance may involve a vehicle communication interface (or another vehicle-based system) transmitting a request for assistance via wireless communication to a computing device positioned remotely from the vehicle. The request for assistance may include sensor data (e.g., images, video, location information, etc.) and other information that can help the remote computing device (or a human operator using the remote computing device) provide some form of assistance to the vehicle that may enable the vehicle overcome the current situation or obstacle.

A vehicle navigating along a travel route may encounter objects in the environment that may cause navigation issues for the vehicle. For example, a vehicle may detect objects in the environment during navigation where the vehicle's systems may have difficulty recognizing and/or identifying the objects. In some instances, the vehicle may detect objects close to the path being traveled by the vehicle and may have difficulty determining the identity, type, and/or category of the detected objects. In some instances, the vehicle may not be able to determine whether the vehicle may contact or touch the detected objects. For the vehicle to continue to navigate in the environment, the vehicle may need to identify or classify the objects to determine whether the vehicle may contact the object, such as vegetation (e.g., bushes, trees, vines on a wall, etc.) or whether the vehicle may not contact the object, such as parked cars in the roadway. When a vehicle encounters these situations, the vehicle may attempt to change navigation operations or stop until further sensor measurements and/or remote guidance may be obtained to resolve or confirm the type of object.

Example embodiments described herein relate to techniques for enabling one or more systems of a vehicle (e.g., a partially or fully autonomous vehicle) to obtain assistance to help the vehicle navigate in an environment. The techniques may enable a remote assistant (e.g., a human assistant or a computer assistant) to assist one or more systems of a vehicle in identifying and navigating obstacles or conditions that may be encountered along a travel route (e.g., road conditions, traffic conditions, obstacles, etc.). When a vehicle detects an object in the environment during operation, the vehicle may request assistance from a remote assistant to help the vehicle identify, recognize, and/or classify the object. The remote assistant may determine the identity or type of object and may send the object type to the vehicle systems to assist the vehicle in navigating in the environment. Remote assistance techniques described herein may be utilized for identifying, recognizing, and classifying objects in various situations, such as when an autonomous vehicle is temporarily stranded at an intersection, a parking lot, in an area with road constructions, or other potential navigation environments.

To further illustrate, a remotely positioned computing device associated with an assistant (e.g., a human operator) may initially receive a request for assistance from a vehicle operating in an environment. For instance, the vehicle may be autonomously navigating a neighborhood or city and encounter an object where the vehicle may need assistance to determine the identity or type of the object for further navigation. The vehicle may send a request for assistance to the remote computing device that includes details related to the vehicle's situation. The request may specify that the vehicle is currently stopped and may need to obtain the identification of an object in the environment. Further, the request for assistance may include sensor data (e.g., images, video, and location information) and/or other information that can help the remote computing device (or assistant using the remote computing device) to select an object type for one or more objects.

The vehicle may request remote assistance if the vehicle is unable to identify and/or classify one or more objects and/or is having difficulty identifying and/or classifying the objects. For example, the vehicle may not be able to determine the type or category of objects in an environment. In some examples, the vehicle may be configured to determine an estimated or preliminary identification and/or classification for the object. The vehicle may provide the estimated or preliminary identification (e.g., object type) to the remote computing device for the assistant or operator to review and to select for the object. For example, the preliminary object identification may be determined locally by one or more systems of the vehicle and provided to the remote computing device. The vehicle may also provide a score indicative of the probability of correctness of the preliminary object identification. Further, the vehicle may request remote assistance if multiple object identifications appear to be comparably viable for the object and/or if a confidence value associated with the object identification is below a threshold confidence level.

Responsive to receiving the request from the vehicle, the remote computing device may provide an interface (e.g., a graphical user interface (GUI)) for an assistant (e.g., a human operator) to review and subsequently provide assistance to the vehicle. Based on an input from the assistant, the remote computing device may transmit information and/or instructions to the vehicle. The interface (e.g., GUI) generated by the remote computing device to enable remote assistance can vary within embodiments. The interface may be used to convey information to the remote assistant about the objects (e.g., representations of the objects) detected by a vehicle so that the assistant may help identify and/or classify the object. The interface of the remote computing device may convey to the assistant object types, classification options, identification options and/or other information obtained from the vehicle. For example, the interface may include images or other sensor data to help represent the objects detected by the vehicle for review by the assistant.

The remote computing device may enable the assistant to review sensor data (e.g., images, video, etc.) obtained from the vehicle in near real-time and to select a particular identification and/or classification that corresponds to the object. For example, the interface associated with the remote computing device may display representations of the object for an assistant or operator to review and to enable the assistant to select an identification and/or classification for the object. The operator may also be able to replay video of the object and/or review multiple images of the object from the vehicle to provide a depiction of the object. Further, the interface may enable an assistant or operator to confirm or deny if the objects are associated with a particular identification and/or classification (e.g., a bush, a parked car, etc.).

Each identification and/or classification for an object may be displayed with a score indicative of the probability of the correctness of the identification and/or classification for the object to help the assistant or operator identify and/or classify the object. For instance, a score may be provided for each object identification and/or classification that represents the probability of a correct identification and/or classification for the object (e.g., 68% vegetation, 12% wall, X % s, and Y % unknown). In some examples, the probability may be calculated by the vehicle and provided to the remote computing device. The interface associated with the remote computing device may also represent other information, such as information relating to the vehicle (e.g., location, quantity of passengers, type of vehicle, etc.).

The interface (e.g., GUI) produced by the remote computing device may enable input from the assistant or operator of the remote computing device. For instance, the remote computing device may provide an interface configured with a single selectable option, which when selected by the assistant or operator, causes the remote computing device to transmit a response to the vehicle that may include an identification and/or classification for an object. In some examples, the interface may display a plurality of selectable options. Each selectable option may be associated with a particular identification and/or classification of an object. A score indicative of the probability of a correct classification and/or identification may be provided for each selected option. In some examples, the selectable option may enable the assistant or operator to confirm or deny if the object is associated with a particular identification and/or classification (e.g., a pedestrian or a scooter). When the remote computing device detects the input from the assistant or operator, the remote computing device may generate information or instructions to be provided to the vehicle.

In some examples, a GUI of the remote computing device 500 may display an image (e.g., an image frame) of at least a portion of the environment captured by a sensor system of a vehicle (e.g., an image capture device, a lidar unit, etc.). The image may be a two or three dimensional image of a sequence of images or image frames. While viewing the environment that is depicted by the image, an assistant or operator may, via the GUI of the remote computing device, indicate, define, or identify one or more boundaries (e.g., line segments) around particular objects or objects of interest within the image by adding or including a graphical representation (such as a bounding box, one or more lines, and/or other types of visual properties) thereof to the image. In some implementations, the GUI may enable the assistant to select an area of an image that encompasses one or more objects. For example, the GUI may enable a bounding region to be placed or positioned around one or more objects within the image, thereby distinguishing the object from other objects within the image. The bounding region can include a bounding box, a bounding circle, a bounding ellipse, or any other suitably-shaped region. While examples are described herein using bounding boxes as examples of bounding regions, one of ordinary skill will appreciate that any other suitable bounding regions could be used instead of bounding boxes.

Further, the GUI of the remote computing device 500 may enable the assistant to associate one or more objects within the boundary region with an object identifier or label that describes, categorizes, identifies, and/or classifies the particular object. For example, the GUI may enable the assistant to annotate or label the objects within the bounded region (e.g., "automobiles", "persons," "bicycles," etc.) with an object label or identifier. In some examples, the assistant may bulk annotate the objects within the boundary region as associated with an object identifier or label. Further, when a subsequent image of the sequence of images is presented on the GUI, the bound region may be maintained in the same location on the GUI. As such, the assistant may instruct the remote computing device to annotate objects detected in the boundary region for subsequent images with a particular object identifier (e.g., static vegetation that is safe to navigate by) for a predetermined amount of time. As a result, objects along the path of the vehicle may be annotated with an object label or identifier (e.g., a certain object type, classification, etc.) to enable the autonomous vehicle to navigate with fewer interventions.

The remote computing device may send the information, such as the identification and/or classification of the object, to the vehicle. Without such information, the vehicle's ability to navigate in the environment may be limited. Upon reception of the information, the vehicle may be configured to develop a navigation strategy based on the information while also monitoring the environment for objects and/or changes that may require the vehicle to stop or change navigation operations. For example, a vehicle may determine a navigation strategy for overcoming situations based on object identification and/or classification.

Remote assistance for vehicles may be obtained from a network of remote assistants (e.g., human operators). For example, a vehicle may submit a request for assistance that is received at an entry point of the network. The entry point may connect the request with an assistant or operator that can provide assistance. The assistant may be selected based on credentials associated with the assistant that indicate the assistant's expertise to handle the type of assistance that is being requested and/or the assistant's availability, among other potential parameters. The entry point may analyze the information within the request to route the request for assistance accordingly. In some examples, the network of remote operators may be used to provide assistance to an entire fleet of autonomous vehicles.

Example systems within the scope of the present disclosure will now be described in greater detail. An example system may be implemented in or may take the form of an automobile, but other example systems can be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well.

Referring now to the figures, FIG. 1 is a functional block diagram illustrating vehicle 100, which represents a vehicle capable of operating fully or partially in an autonomous mode. More specifically, vehicle 100 may operate in an autonomous mode without human interaction (or reduced human interaction) through receiving control instructions from a computing system (e.g., a vehicle control system). As part of operating in the autonomous mode, vehicle 100 may use sensors (e.g., sensor system 104) to detect and possibly identify objects of the surrounding environment to enable safe navigation. In some implementations, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. The subsystems and components of vehicle 100 may be interconnected in various ways (e.g., wired or secure wireless connections). In other examples, vehicle 100 may include more or fewer subsystems. In addition, the functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, one or more electric motors, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheel.

Transmission 120 may transmit mechanical power from the engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, one or more radar units 126, laser rangefinder/LIDAR unit 128, camera 130, steering sensor 123, and throttle/brake sensor 125, among other possible sensors. In some implementations, sensor system 104 may also include sensors configured to monitor internal systems of the vehicle 100 (e.g., 02 monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects (e.g., radar signals), including the speed and heading of the objects, within the local environment of vehicle 100. As such, radar unit 126 may include one or more radar units equipped with one or more antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, the angle of the gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may securely and wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle. In some embodiments, computer system 112 may make a determination about various objects in the environment based on data that is provided by systems of the vehicle. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors. Further, computing system 112 may also classify and/or identify an object in the environment based on the output of the various sensors and may request remote assistance when different classifications are determined for an object. Further, computing system 112 may request remote assistance if the vehicle is unable to identify and/or classify one or more objects and/or is having difficulty identifying and/or classifying the objects. In addition, vehicle 100 may also include telematics control unit (TCU) 160. TCU 160 may enable vehicle connectivity and internal passenger device connectivity through one or more wireless technologies.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A, 2B, 2C, 2D, and 2E illustrate different views of a physical configuration of vehicle 100. The various views are included to depict example sensor positions 202, 204, 206, 208, 210 on vehicle 100. In other examples, sensors can have different positions on vehicle 100. Although vehicle 100 is depicted in FIGS. 2A-2E as a van, vehicle 100 can have other configurations within examples, such as a truck, a car, a semi-trailer truck, a motorcycle, a bus, a shuttle, a golf cart, an off-road vehicle, robotic device, or a farm vehicle, among other possible examples.

As discussed above, vehicle 100 may include sensors coupled at various exterior locations, such as sensor positions 202-210. Vehicle sensors include one or more types of sensors with each sensor configured to capture information from the surrounding environment or perform other operations (e.g., communication links, obtain overall positioning information). For example, sensor positions 202-210 may serve as locations for any combination of one or more cameras, radars, LIDARs, range finders, radio devices (e.g., Bluetooth and/or 802.11), and acoustic sensors, among other possible types of sensors.

When coupled at the example sensor positions 202-210 shown in FIGS. 2A-2E, various mechanical fasteners may be used, including permanent or non-permanent fasteners. For example, bolts, screws, clips, latches, rivets, anchors, and other types of fasteners may be used. In some examples, sensors may be coupled to the vehicle using adhesives. In further examples, sensors may be designed and built as part of the vehicle components (e.g., parts of the vehicle mirrors).

In some implementations, one or more sensors may be positioned at sensor positions 202-210 using movable mounts operable to adjust the orientation of one or more sensors. A movable mount may include a rotating platform that can rotate sensors so as to obtain information from multiple directions around vehicle 100. For instance, a sensor located at sensor position 202 may use a movable mount that enables rotation and scanning within a particular range of angles and/or azimuths. As such, vehicle 100 may include mechanical structures that enable one or more sensors to be mounted on top the roof of vehicle 100. Additionally, other mounting locations are possible within examples. In some situations, sensors coupled at these locations can provide data that can be used by a remote operator to provide assistance to vehicle 100.

Figure 3:
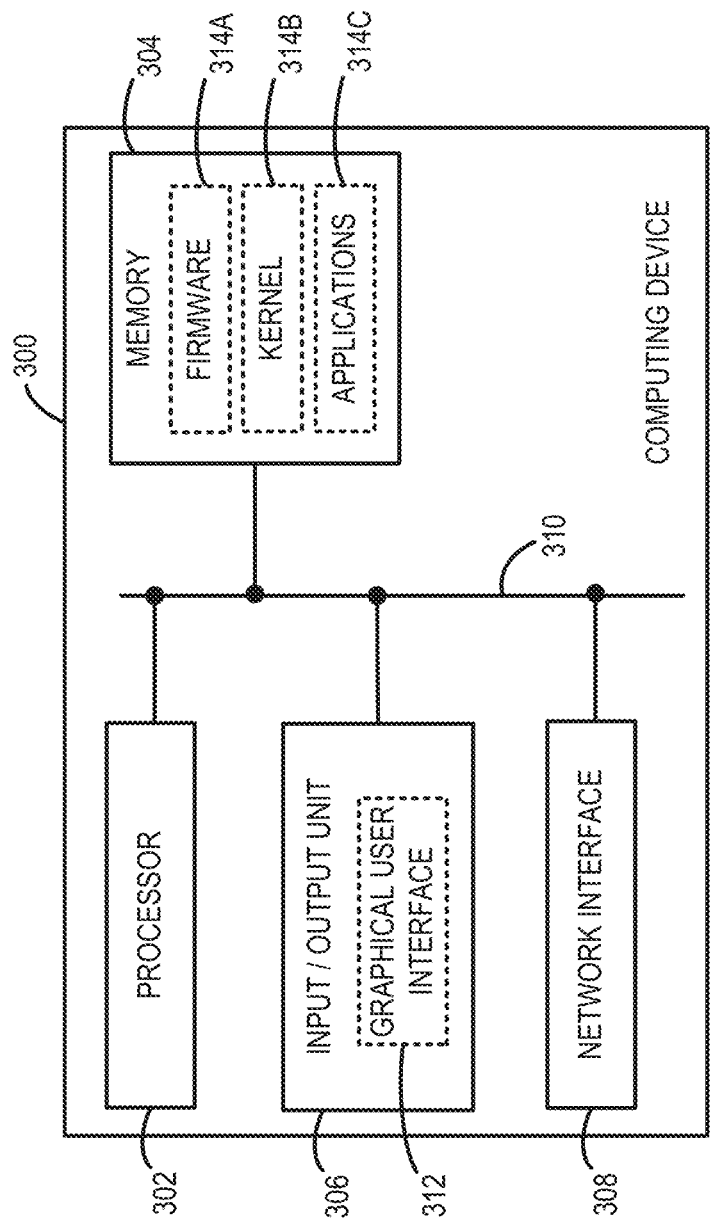
FIG. 3 is a simplified block diagram of a computing system, according to one or more example embodiments.

FIG. 3 is a simplified block diagram exemplifying computing device 300, illustrating some of the components that may be included in a computing device arranged to operate in accordance with the embodiments herein. Computing device 300 may be implemented as computer system 112, which may be located on vehicle 100 and perform processing operations related to vehicle operations. For example, computing device 300 may be used to process sensor data received from sensor system 104. In some examples, computing system 300 may include a computing device within the vehicle to enable a passenger or driver of the vehicle to act as an operator, such as a touchscreen interface for displaying remote assistance information. Alternatively, computing device 300 may be located remotely from vehicle 100 and communicate via wireless communication. For example, computing device 300 may operate as a remotely positioned device that a remote human operator can use to communicate with one or more vehicles.

In the example embodiment shown in FIG. 3, computing device 300 includes processor or processing system 302, memory 304, input/output unit 306, and network interface 308, all of which may be coupled by a system bus 310 or a similar mechanism. In some embodiments, computing device 300 may include other components and/or peripheral devices (e.g., detachable storage, sensors, and so on)

Processor 302 may be one or more of any type of computer processing device or element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 302 may be one or more single-core processors. In other cases, processor 302 may be one or more multi-core processors with multiple independent processing units. Processor 302 may also include register memory for temporarily storing instructions being executed and related data, as well as cache memory for temporarily storing recently-used instructions and data.

Memory 304 may store program instructions and/or data on which program instructions may operate. By way of example, memory 304 may store program instructions on a non-transitory, computer-readable medium, such that the instructions are executable by processor 302 to carry out any of the methods, processes, or operations disclosed in this specification or the accompanying drawings. Memory 304 may be any form of computer-usable memory, including but not limited to random access memory (RAM), read-only memory (ROM), and non-volatile memory. This may include flash memory, hard disk drives, solid state drives, re-writable compact discs (CDs), re-writable digital video discs (DVDs), and/or tape storage, as just a few examples. Further, Memory 304 may include fixed memory as well as one or more removable memory units, the latter including but not limited to various types of secure digital (SD) cards. Thus, memory 304 can represent both main memory units, as well as long-term storage. Other types of memory may include biological memory.

As shown in FIG. 3, memory 304 may include firmware 314A, kernel 314B, and/or applications 314C. Firmware 314A may be program code used to boot or otherwise initiate some or all of the functions or operations of the computing device 300. Kernel 314B may be an operating system, including modules for memory management, scheduling and management of processes, input/output, and communication. Kernel 314B may also include device drivers that allow the operating system to communicate with the hardware modules (e.g., memory units, networking interfaces, ports, and busses) of computing device 300. Applications 314C may be one or more user-space software programs, such as web browsers or email clients, as well as any software libraries used by these programs. In some examples, applications 314C may include one or more neural network applications and other deep learning-based applications. Memory 304 may also store data used by these and other programs and applications.

Input/output unit 306 may facilitate user and peripheral device interaction with computing device 300 and/or other computing systems. Input/output unit 306 may include one or more types of input devices, such as keyboards, one or more touch screens, sensors, biometric sensors, and so on. Similarly, input/output unit 306 may include one or more types of output devices, such as a screen, monitor, printer, speakers, and/or one or more light emitting diodes (LEDs). Additionally or alternatively, computing device 300 may communicate with other devices using a universal serial bus (USB) or high-definition multimedia interface (HDMI) port interface, for example. In some examples, input/output unit 306 can be configured to receive data from other devices. For instance, input/output unit 306 may receive sensor data from vehicle sensors.

As shown in FIG. 3, input/output unit 306 includes graphical user interface (GUI) 312, which may be configured to provide information to an operator or another user. GUI 312 may display one or more display interfaces, or another type of mechanism for conveying information and receiving inputs. In some examples, the representation of GUI 312 may differ depending on a vehicle situation. For example, computing device 300 may provide GUI 312 in a particular format, such as a format with a single selectable option for a remote operator to select from.

Network interface 308 may take the form of one or more wireline interfaces, such as Ethernet (e.g., Fast Ethernet, Gigabit Ethernet, and so on). Network interface 308 may also support communication over one or more non-Ethernet media, such as coaxial cables or power lines, or over wide-area media, such as Synchronous Optical Networking (SONET) or digital subscriber line (DSL) technologies. Network interface 308 may additionally take the form of one or more wireless interfaces, such as IEEE 802.11 (Wifi) interfaces, BLUETOOTH® interfaces, global positioning systems (GPS), or a wide-area wireless interfaces. However, other forms of physical layer interfaces and other types of standard or proprietary communication protocols may be used over network interface 308. Furthermore, network interface 308 may comprise multiple physical interfaces. For instance, some embodiments of computing device 300 may include Ethernet, BLUETOOTH®, and Wifi interfaces. In some embodiments, network interface 308 may enable computing device 300 to connect with one or more vehicles to allow for remote assistance techniques presented herein.

Referring still to FIG. 3, when computing device 300 determines that a vehicle may encounter a condition or situation along a travel route where navigation progress may be impeded, computing device 300 may obtain remote assistance. Computing device 300 may generate a request to obtain remote assistance from an assistant (e.g., a human assistant and/or a computing assistant) that may help resolve a variety of conditions or situations (e.g., obstacles, road conditions, traffic conditions, etc.) that a human driver would typically be able to overcome. For example, remote assistance may be used for assisting computing device 300 to determine traffic and/or road conditions, avoid obstacles, monitor performance of a route, adjust the navigation of the route, confirm or deny navigation options or maneuvers proposed by a vehicle navigation system, check on passengers, and/or perform other forms of remote assistance.

Further, computing device 300 may request remote assistance to help identify and/or classify objects in the environment in which the vehicle operates. Such objects may include pedestrians, street signs, vehicles, vegetation, and other various objects or obstacles detected in the environment. Computing device 300 may be configured to receive sensor data representative of the objects from a sensor system of the vehicle. For example, a sensor system of the vehicle may detect objects in the environment and provide sensor data representing the objects to computing device 300. The sensor system may have various sensors, including one or more cameras, one or more radar units, one or more light detection and ranging (lidar) sensors, one or more microphones, one or more radio units, and other sensors. Each of the sensors may capture sensor data and communicate the sensor data to the computing device 300. In some implementations, the sensor data may be received from an image capture device (e.g., a camera) and may include image or video data. In other implementations, the sensor data may include data received from a lidar unit. Further, the sensor data may include radar, audio, or other sensor data.

Computing device 300 may be configured to detect objects in the environment based on the sensor data and may analyze the sensor data to determine a classification and/or identification of the object (e.g. an object type). In some implementations, computing device 300 may identify and/or classify objects based on a set of known data. For example, sensor data related to objects may be stored in a memory device. Computing device 300 may compare the received sensor data to the stored sensor data to classify and/or identify objects. In other implementations, computing device 300 may be configured to determine objects based on the context of the data. For example, street signs related to construction may generally have an orange color. As such, computing device 300 may classify objects as constructed-related street signs when computing device 300 detects objects that are orange and are located near the side of roadways.

When computing device 300 is unable to identify and/or classify an object and/or has difficulty identifying and/or classifying the object, the computing device 300 can request a remote assistant (or a more powerful computing device) to perform one or more assistance tasks. In some examples, when computing device 300 has difficulty identifying the object, computing device 300 may associate the object with an initial identification and/or classification having a low confidence level. Computing device 300 may transmit the sensor data to a remote computing device over a network, and in some implementations, via a server The human operator or assistant associated with the remote computing device may in turn use the sensor data as a basis for responding to the request.

The request for assistance sent by computing device 300 to the remote computing device may indicate details related to the vehicle's situation. For example, the request for assistance may include the sensor data representing an object (e.g., image data, lidar data, audio data, etc.) and one or more initial classifications and/or identifications of the object in the environment. The request for assistance may also include a score indicative of the probability of the correctness of each initial classification and/or identification for the object in order to help the assistant or operator classify and/or identify the object. For instance, a score may be provided for each initial classification that represents the probability of a correct initial classification and/or identification of the object (e.g., 68% pedestrian, 12% scooter, X % sign, and Y % unknown). Further, the request may specify that the vehicle is currently stopped and may need assistance for classifying and/or identifying the object or obstacle in the environment.

In some implementations, the remote assistance process may be triggered in response to computing device 300 unable to determine a classification and/or identification for an object. For example, during the operation of the vehicle, computing device 300 may acquire (e.g., via cameras, lidar sensors, radar sensors, and/or other sensors) sensor data representing an object or obstacle in the vehicle's environment Computing device 300 may not be able to determine an identification and/or classification for the object based on the sensor data. In response, computing device 300 may send to the remote computing system (e.g. a remote assistant) an estimated or initial identification and/or classification along with the sensor data that includes the object, such as in the form of an image or video of the object and/or audio from the object For example, computing device 300 may be configured to provide the initial identification and/or classifications for the object to the remote computing device for an assistant (e.g., human operator) to review and to select therefrom.

Computing device 300 may receive a response from the remote computing device that includes information and/or navigation instructions. For example, the response may include a correct identification and/or classification for the object and/or one or more instructions from the assistant or an operator of the remote computing device. Computing device 300 may use the information from the remote computing device as a basis to control or navigate the vehicle. For example, the response may include information or instructions to control the operation of the vehicle (e.g., instruct the vehicle to stop at a stop sign if the human operator determines that the object is a stop sign), although in some scenarios, the vehicle itself may control its own operation based on the information from the assistant including the classification of the object.

In some implementations, computing device 300 may analyze the sensor data representative of the objects in the environment to determine a confidence value associated with the initial identification and/or classification of the object by computing device 300 The confidence value may be indicative of a likelihood that the object is correctly identified or classified. The confidence value may be calculated in various ways depending on the implementation. In one example, when detecting objects in the environment, computing device 300 may compare sensor data to predetermined data relating to an object classification or indication. The closer the match between the sensor data to the predetermined data, the higher the confidence value. In other implementations, computing device 300 may use a mathematical analysis of the sensor data to determine a confidence value associated with the identification and/or classification of the object. For example, computing device 300 may detect objects within the received sensor data (e.g., image data) and determine a confidence value associated with the object.

Further, computing device 300 may determine that an object has a low detection confidence through analysis of sensor data of the vehicle. In some examples, computing device 300 may determine that the identification and/or classification of the object has a low confidence value based on being unable to classify the object with a confidence value above the confidence threshold value. For example, if a result of an identification and/or classification of the object is inconclusive, then the confidence value may be low or below the confidence threshold value.

In response to determining that an object in the environment has a low confidence value, the computing device 300 may transmit, to the remote computing system, a request for remote assistance with the initial identification and/or classification of the object. For example, computing device 300 may determine that a classification of an object has a confidence below a confidence threshold value based on sensor data received from the vehicle and may request assistance for object identification and/or classification.

The confidence threshold value may be determined or computed by computing device 300 and may vary depending on the type of object being detected. For example, the confidence threshold value may be lower for an object that may require a quick responsive action from the computing device 300, such as brake lights or another vehicle. However, in other implementations, the confidence threshold value may be the same for all detected objects. When the confidence value associated with a detected object is greater than the confidence threshold value, computing device 300 may assume the object was correctly classified and responsively adjust the control of the vehicle based on that assumption. Further, when the confidence level associated with a detected object is less than the confidence threshold value, computing device 300 may request a remote assistant to determine the identification and/or classification for the object.

In some implementations, a remote assistance process may be triggered in response to a vehicle system determining that a confidence level associated with an identification and/or classification for an object is below a confidence threshold value. As an example of the remote assistance process, computing device 300 may acquire (e g., via cameras, lidar sensors, radar sensors, and/or other sensors) sensor data representative of an object in the vehicle's environment. Computing device 300 may then determine that a confidence value for the identification and/or classification of the object is below a predefined threshold value, and then send, to a remote computing device, the sensor data representative of the object, such as in the form of an image or a video of the object, and/or audio from the object. An assistant or operator associated with the remote computing device may provide an input to the remote computing system indicative of a correct identification and/or classification of the object and/or one or more instructions for controlling the vehicle. The remote computing device may transmit the response wirelessly or by some other manner to the computing device 300 of the vehicle.

Further, computing device 300 may receive the response to the request for assistance from a remote computing device. The response may include a representation of the input and/or feedback from the assistant (e g., human operator), whether in the form of an instruction for controlling the vehicle, a correct classification and/or identification of the object at issue, and/or some other form of feedback. Upon receipt of the response, computing device 300 may provide one or more instructions to the vehicle to operate in a manner that is in accordance with the response. For example, based on the response, the computing system 300 may provide one or more instructions to alter the vehicle's movement, such as by stopping the vehicle, switching the vehicle to a human-controlled mode, changing a velocity of vehicle (e.g., a speed and/or direction), and/or another movement alteration.

Figure 4:
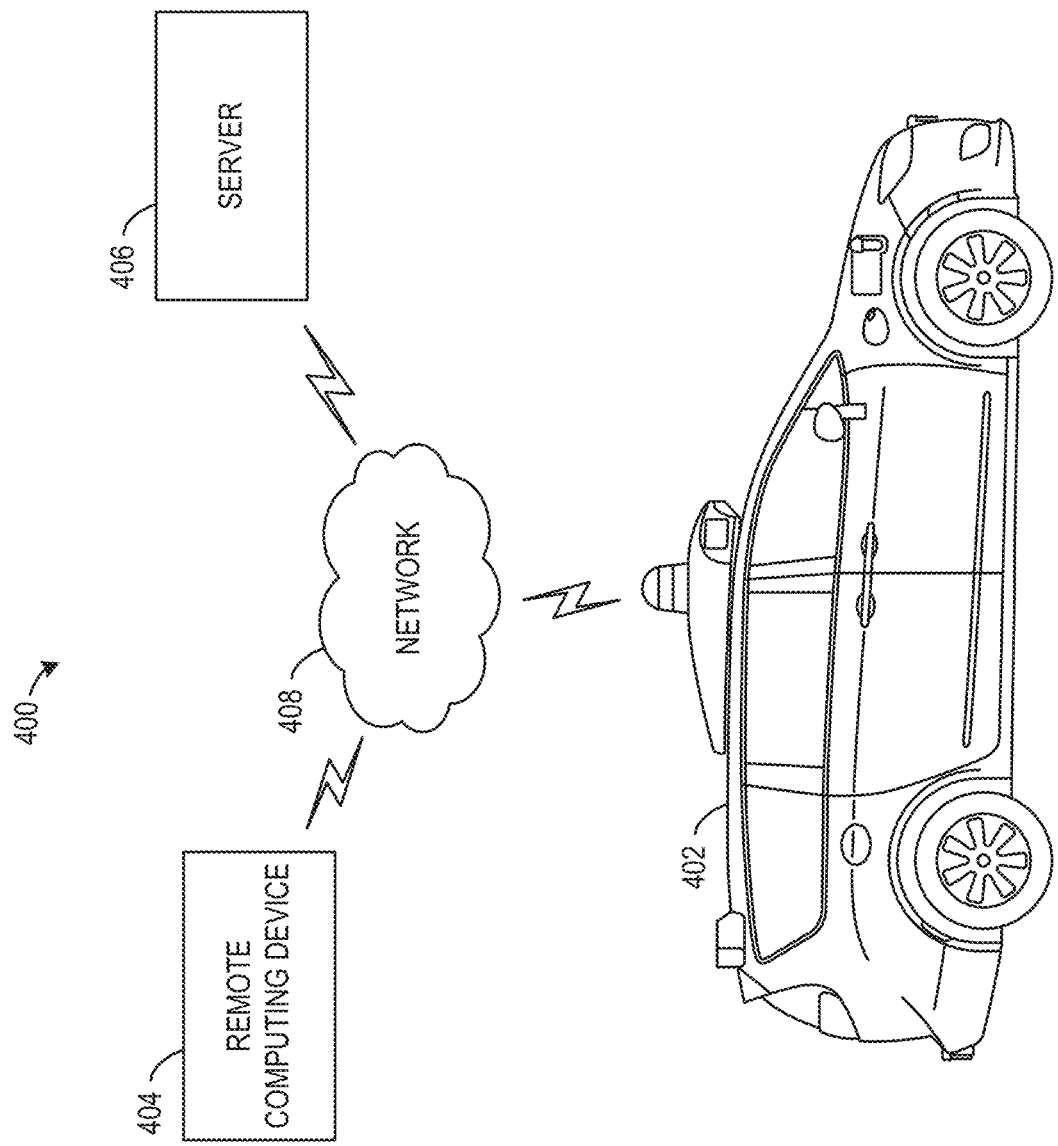
FIG. 4 is a system for wireless communication between computing devices and a vehicle, according to one or more example embodiments.

FIG. 4 is a system for wireless communication between computing devices and a vehicle, according to one or more example embodiments. System 400 may enable vehicles (e.g., vehicle 402) to obtain remote assistance from assistants (e.g., human operators) using computing devices positioned remotely from the vehicles (e.g., remote computing device 404). Particularly, system 400 is shown with vehicle 402, remote computing device 404, and server 406 communicating wirelessly via network 408. System 400 may include other components not shown within other embodiments, such as firewalls and multiple networks, among others.

Vehicle 402 may transport passengers or objects between locations, and may take the form of any one or more of the vehicles discussed above, including passenger vehicles, cargo shipping vehicles, farming and manufacturing vehicles, and dual-purpose vehicles. When operating in an autonomous mode (or semi-autonomous mode), vehicle 402 may navigate to pick up and drop off passengers (or cargo) between desired destinations. In some embodiments, vehicle 402 can operate as part of a fleet of vehicles, such as within a fleet of ride-share vehicles.

Remote computing device 404 may represent any type of device related to enabling remote assistance techniques, including but not limited to those described herein. Within examples, remote computing device 404 may represent any type of device configured to (i) receive information related to vehicle 402, (ii) provide an interface (e.g., a GUI, physical input interfaces) through which a human operator can in turn perceive the information and input a response related to the information, and (iii) transmit the response to vehicle 402 or to other devices (e.g., storage at server 406). As such, remote computing device 404 may take various forms, such as a workstation, a desktop computer, a laptop, a tablet, a mobile phone (e.g., a smart phone), a wearable device (e.g., a headset) and/or a server. In some examples, remote computing device 404 may include multiple computing devices operating together in a network configuration. In further embodiments, remote computing device 404 may resemble a vehicle simulation center with the remote operator positioned as the drive of the simulation center. In addition, remote computing device 404 may operate as a head mountable device that can simulate the perspective of vehicle 402.

The position of remote computing device 404 relative to vehicle 402 can vary within examples. For instance, remote computing device 404 may have a remote position from vehicle 402, such as operating inside a physical building. In another example, remote computing device 404 may be physically separate from vehicle 402, but operate inside vehicle 402 to enable a passenger of vehicle 402 to act as the human operator. For instance, remote computing device 404 may be a touchscreen device operably by a passenger of vehicle 402. Operations described herein that are performed by remote computing device 404 may be additionally or alternatively performed by vehicle 402 (i.e., by any system (s) or subsystem(s) of vehicle 100). In other words, vehicle 402 may be configured to provide a remote assistance mechanism with which a driver or passenger of the vehicle can interact.

Operations described herein may be performed by any of the components communicating via network 408. For instance, remote computing device 404 may determine remote assist options for a human operator to review based on different levels of information provided by vehicle 402. In some embodiments, vehicle 402 may determine potential navigation options for remote computing device 404 to display for a remote operator to review. Potential options could include routes, vehicle movements, and other navigation parameters for review by remote computing device 404 and/or a remote operator using remote computing device 404.

In other embodiments, remote computing device 404 may analyze sensor data or other information from vehicle 402 to determine the situation and potential options for a remote operator to review. For instance, remote computing device 404 may determine a route and/or operations for vehicle 402 to execute using information from vehicle 402 and/or other external sources (e.g., server 406). In some embodiments, remote computing device 404 may generate a GUI to display one or more selectable options for review by a remote operator.

Server 406 may be configured to wirelessly communicate with remote computing device 404 and vehicle 402 via network 408 (or perhaps directly with remote computing device 404 and/or vehicle 402). As such, server 406 may represent any computing device configured to receive, store, determine, and/or send information relating to vehicle 402 and the remote assistance thereof. As such, server 406 may be configured to perform any operation(s), or portions of such operation(s), that is/are described herein as performed by remote computing system 404 and/or vehicle 402. Some implementations of wireless communication related to remote assistance may utilize server 406, while others may not.

Network 408 represents infrastructure that may enable wireless communication between computing devices, such as vehicle 402, remote computing device 404, and server 406. For example, network 408 can correspond to a wireless communication network, such as the Internet or a cellular wireless communication network. The various systems described above may perform various operations. These operations and related features will now be described.

In some examples, a remote computing system (e.g., remote computing device 404 or server 406) may operate in one of two modes. The first of these modes may serve, in essence, as a means for a human operator (of the vehicle and/or the remote computing system) to provide remote assistance support for the vehicle. The remote computing system may enable a human operator to provide this support in near real-time or less frequently than real-time.

The second of these two modes may serve, at a minimum, as a means for keeping the human operator alert. The human operator may be a passenger or driver of the vehicle, or may be a third party located remotely from the vehicle but tasked with the responsibility of providing remote assistance to the vehicle (and possibly to other vehicles as well). Regardless of who the human operator is, it is desirable to keep the human operator alert so that the human operator can provide optimal remote assistance with minimal delay.

For instance, there may be scenarios in which the vehicle may not have requested remote assistance in a certain amount of time (e.g., one hour), and therefore the human operator tasked with providing remote assistance to the vehicle may not have taken any remote assistance action in that amount of time, which may be long enough where the human operator may become fatigued or otherwise less attentive than desirable. In these and other types of possible scenarios, it may be desirable to periodically prompt the human operator during this time, via the remote computing system, with alertness data to keep them alert. The alertness data may take various forms, such as archived images, audio, or video having confirmed or unconfirmed object identifications, also including generated natural-language questions regarding the confirmed or unconfirmed object identifications.

Remote assistance tasks may also include the human operator providing an instruction to control operation of the vehicle (e.g., instruct the vehicle to travel to a particular destination associated with an identified passenger). In some scenarios, the vehicle itself may control its own operation based on the human operator's feedback related to an identification of an object. Upon receiving a confirmation that the occupancy of the vehicle meets a desired occupancy, the vehicle control system may cause the vehicle to safely transport the passengers to a requested destination. Further, a remote operator can enable a vehicle to temporarily perform one or more operations to resolve a situation that the vehicle may normally not be permitted to perform. For instance, remote computing device 404 may be used to enable vehicle 402 to back up, navigate with a decreased buffer zone, or travel in a zone that is usually off limits (e.g., over the median or use a driveway).

In some embodiments, remote assistance for vehicles may originate from a network of remote operators. For example, a vehicle may submit a request for assistance that is received at an entry point of the network. The entry point may connect the request with a remote operator that can provide assistance. The remote operator may be selected based on credentials associated with the remote operator that indicate that she or he is able to handle the type of assistance that is being requested and/or the operator's availability, among other potential parameters. The entry point may analyze information within the request to route requests for assistance accordingly. For example, the network of remote operators may be used to provide assistance to an entire fleet of autonomous vehicles.

Figure 5:
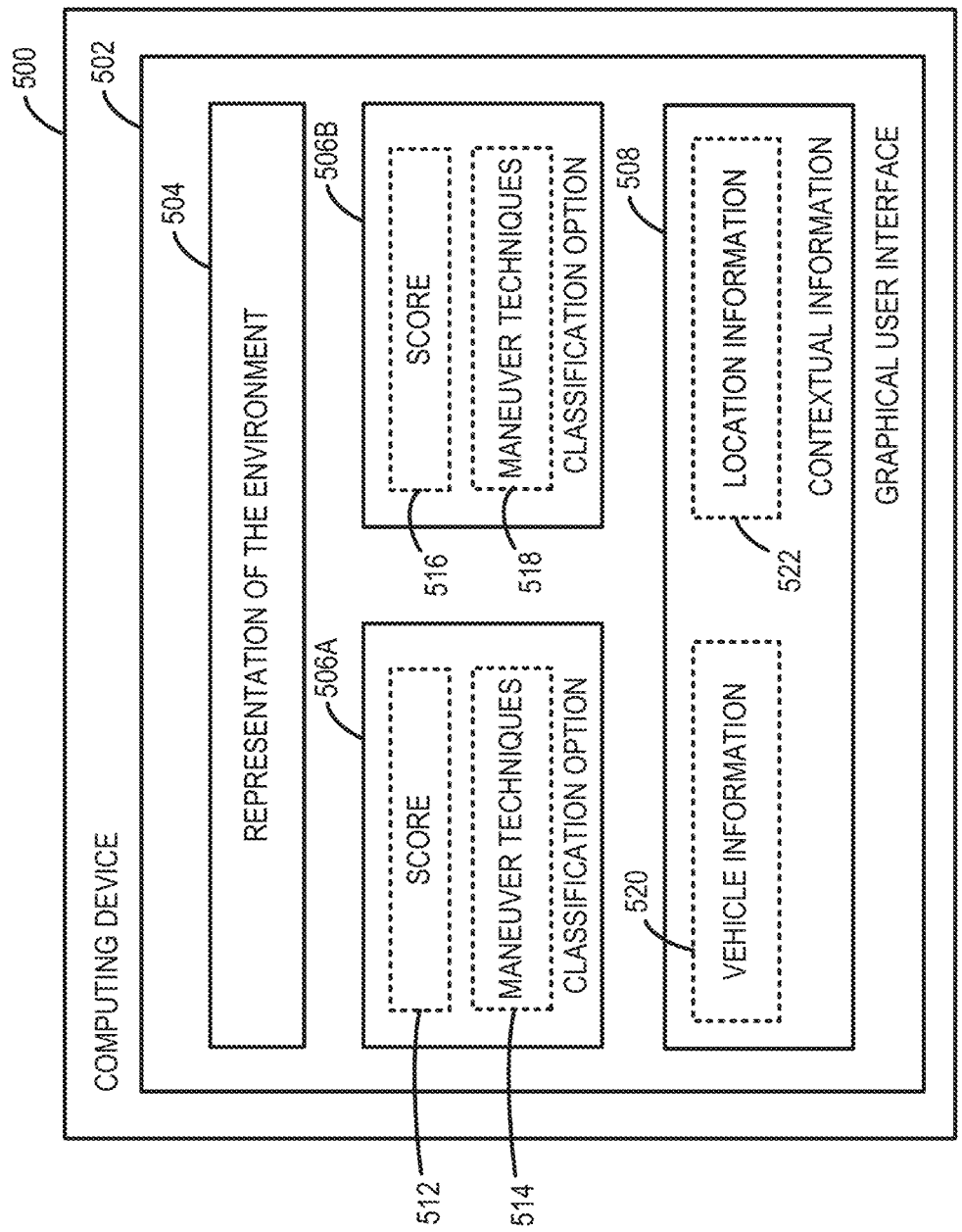
FIG. 5 illustrates a computing device displaying a graphical user interface for enabling remote assistance, according to one or more example embodiments.

FIG. 5 illustrates a computing device for enabling remote assistance to be provided to a vehicle, according to one or more example embodiments. When remote assistance is requested by a vehicle, a remote computing device may be configured to enable an assistant (e.g., a human operator) to provide information to the vehicle (e.g., a classification or identification for an object in an environment). For example, the remote computing device may display, on a touchscreen, a graphical user interface (GUI) including information about a vehicle's environment (e.g., captured images or video of objects in the environment). In some embodiments, a human operator may be presented with a GUI that shows the vehicles sensor data representation of at least a portion of the environment and one or more classifications for an object. Depending on the type of response to be provided to the vehicle, the GUI may allow the operator to input information or guidance to the vehicle in a number of different ways (e.g. selecting from a list of operations, identifications and/or classifications, typing in a particular mode of operation, selecting a particular region of focus within an image of the environment, etc.).

As shown in FIG. 5, computing device 500 is displaying GUI 502, which may include a representation of the environment 504, classification/identification option 506A, classification/identification option 506B, and contextual information 508. In other embodiments, GUI 502 may include more or less elements in other potential arrangements. GUI 502 may represent a system of interactive visual components for computer software. As such, GUI 502 may be used to display objects that convey information to a remote operator and also represent actions that may be taken by the remote operator. Computing device 500 may generate GUI 502 based on templates enabling an available remote operator to quickly review and provide assistance to a vehicle. In addition, computing device 500 may display GUI 502 on a display interface, such as a touch screen or external monitor. In other examples, computing device 500 may display GUI 502 or elements from GUI 502 via a display interface associated with a head-mounted wearable computing device (e.g., augmented reality).

Computing device 500 may use GUI 502 to enable interaction between a human operator and vehicles that request assistance. The human operator may provide inputs to computing device 500 via touch inputs, buttons or hardware inputs, motion and vocal inputs. For example, computing device 500 may include a microphone to receive vocal inputs and use speech recognition software to derive operations based on the vocal inputs from the operator. In some examples, computing device 500 may resemble a vehicle emulator that enables a human operator to experience a simulation that mimics the vehicle's perspective.

Representation of the environment 504 is an object displayable via GUI 502 that may represent the current environment (or recent environment) from the perspective of the vehicle. By displaying representation of the environment 504, a remote operator may review a sensor perspective of the environment as captured by vehicle sensors. For instance, representation of the environment 504 may display images and/or video of the environment as captured by vehicle cameras. In other instances, sensor data from different types of sensors may be used to generate and provide representation of the environment 504 via GUI 502. For instance, representation of the environment 504 may include a point cloud developed using radar and/or lidar. As such, representation of the environment 504 may show the positions of objects, obstacles or other environment elements that may be near or have disrupted the path of travel of the vehicle that is requesting assistance. For example, representation of the environment 504 may depict the road, other vehicles, pedestrians, bicycles, traffic signals and signs, road elements, and other features within the vehicle's environment.

In some examples, representation of the environment 504 may depict the vehicle's environment in real-time. For example, vehicle sensors (e.g., cameras) may capture and provide sensor data (e.g., images) of the environment in near real-time to computing device 500 enabling a human operator to observe the current state of the vehicle's environment. In some examples, the representation of the environment 504 may depict one or more objects for the human operator to review and classify as further described below.

Computing device 500 may use visual indicators, such as arrows, boxes, or a combination to highlight aspects of the environment, such as the obstacles near or blocking the path of travel of the vehicle. For example, computing device 500 may be able to detect elements within images and identify elements using different colors, such as red boxes to identify pedestrians, blue boxes for other vehicles, and green boxes for stationary objects.

In some examples, the GUI of the computing device 500 may display an image (e.g., an image frame) of at least a portion of the environment captured by a sensor system of a vehicle (e.g., an image capture device, a lidar unit, etc.). The image may be a two or three dimensional image of a sequence of images or image frames. While viewing the environment that is depicted by the image, the assistant may, via the GUI of the computing device 500, indicate, define, or identify one or more boundaries (e.g., line segments) around particular objects or objects of interest within the image by adding or including a graphical representation (such as a bounding box, one or more lines, and/or other types of visual properties) thereof to the image. In some implementations, the GUI may enable the assistant to select an area of an image that encompasses one or more objects. For example, the GUI may enable a bounding region to be placed or positioned around one or more objects within the image, thereby distinguishing the object from other objects within the image. The bounding region can include a bounding box, a bounding circle, a bounding ellipse, or any other suitably-shaped region. While examples are described herein using bounding boxes as examples of bounding regions, one of ordinary skill will appreciate that any other suitable bounding regions could be used instead of bounding boxes.

Further, the GUI of the computing device 500 may enable the assistant to associate one or more objects within the boundary region with an object identifier or label that describes, categorizes, identifies, and/or classifies the particular object. For example, the GUI may enable the assistant to annotate or label the objects within the bounded region (e.g., "automobile", "person," "bicycle," etc.) with an object label or identifier. In some examples, the assistant may bulk annotate the objects within the boundary region as associated with an object identifier or label. Further, when a subsequent image of the sequence of images is presented on the GUI, the bound region may be maintained in the same location on the GUI. As such, the assistant may instruct the remote computing device to annotate objects detected in the boundary region for subsequent images with a particular object identifier or label (e.g., static vegetation that is safe to navigate by) for a predetermined amount of time. In some examples, the assistant may refine the boundaries of the boundary region for subsequent image frames in order to annotate various objects in subsequent image frames. As a result, objects along the path of the vehicle may be annotated with an object label or identifier (e.g., a certain object type) to enable the autonomous vehicle to navigate with fewer interventions.

Computing device 500 may further obtain map data based on a location of the vehicle. For instance, the vehicle may provide GPS measurements or another indication of the vehicle's location within the request for assistance or during subsequent communication between the vehicle and computing device 500. By using the vehicle's location, computing device 500 may acquire map data and further enhance the information included within representation of the environment 504 and/or other objects displayed via GUI 502. For example, computing device 500 may determine and display representation of environment 504 as an elevated view of the vehicle and nearby surroundings based on the map data and the sensor data from the vehicle. In some examples, GUI 502 may include both a sensor perspective of the vehicle's environment and the elevated view based on one or both of the sensor data and map data.

Classification/identification options 506A, 506B may represent different classifications and/or identifications for an object (e.g., object type, object category, etc.) that may be displayed by GUI 502. A human operator or assistant may review and select classification/identification option 506A or classification/identification option 506B to cause computing device 500 to relay a classification and/or identification for the object. In some implementations, the vehicle may receive identifications and/or classifications for objects from computing device 500 and perform navigation options based on the identifications and/or classifications while monitoring for changes in the environment that may require modifying or stopping performance of navigation operations. For instance, while performing a navigation strategy based on the identifications and/or classifications of objects, the vehicle may detect the presence of another vehicle or pedestrian that may alter the performance of the remote assistance strategy.

In the embodiment shown in FIG. 5, GUI 502 shows two identification and/or classification options (i.e., classification/identification options 506A, 506B). In some instances, GUI 502 may show only one classification option or more than two classification options. The number of classification options may depend on the situation that the vehicle is involved in when requesting assistance. In some examples, the number of classification options may also be limited to potentially decrease the amount of time that the human operator uses to provide options. For example, a high number of classification options (e.g., 4 or more) may take too much time to review. In addition, the quality of the proposed classification options may decrease as the quantity increases. In some examples, the autonomous vehicle may be configured to only transmit the best classification option based on sensor data measuring the environment.

In some examples, computing device 500 may receive a request for assistance that does not include any proposed identification and/or classification options. Computing device 500 may display GUI 502 with an indication that the vehicle systems are requesting the human operator to provide an identification and/or classification for an object to the vehicle. Further, GUI 502 may enable a human operator to adjust or change existing identification and/or classification options or provide a different identification and/or classification for an object determined by the human operator.

In some examples, classification/identification options 506A, 506B may be displayed in a visual representation that enables quick review by a human operator. Further, GUI 502 may display multiple classification/identification options (e.g., both classification option 506A and classification option 506B) together to enable a human operator to review and compare. In some instances, GUI 502 may be configured to display only a single identification and/or classification option at a time to avoid confusion.

In some examples, objects may be displayed in an augmented reality via images and/or video data received by computing device 500 in near real-time. Particularly, the human operator may watch and monitor the vehicle's environment using video, images, and/or other sensor data from the vehicle as the vehicle awaits and receives remote assistance. For example, GUI 502 can display images or video received from the vehicle in near real-time to enable the human operator to provide continuous assistance to the vehicle. This technique may enable a human operator to closely review the environment of the vehicle and to provide useful remote assistance based on a clear understanding of the environment.

In the embodiment shown in FIG. 5, each classification/identification option 506A, 506B may be displayed with additional information developed to assist the human operator review, such as score 512 and score 516, respectively. Scores 512, 516 may indicate the probability that each classification and/or identification is correct for the object. For instance, a score may be provided for each identification and/or classification that represents the probability of a correct classification and/or identification of the object (e.g., 68% pedestrian, 12% scooter, X % sign, and Y % unknown).

As shown in FIG. 5, each classification option 506A, 506B may also indicate maneuver techniques 514, 518, respectively. Maneuver techniques 514, 518 may convey one or more maneuvers that the vehicle will perform should a particular classification option be selected. For example, classification option 506A may include a U-turn, which is represented by maneuver technique 514 as a description (e.g. "U-turn here") or a visual representation. In some examples, only maneuver techniques that require human operator approval prior to performance may be represented via maneuver techniques 514, 518.

GUI 502 may also include contextual information 508, which may convey additional information to supplement a remote operator's understanding of the vehicle's situation. As shown in FIG. 5, contextual information 508 includes vehicle information 510 and location information 522. Vehicle information 520 may indicate a variety of information about the vehicle, such as the type of vehicle, the vehicle sensors on the vehicle, the quantity of the passengers, and target destination, etc. Location information 522 may represent information based on the current location of the vehicle, such as map data depicting the environment. Contextual information 508 may also specify information related to the situation, such as how long has the vehicle been stranded and a reason proposed by the vehicle for the stranding.

Referring still to FIG. 5, computing device 500 may obtain information about objects from vehicles operating in the environment and provide the information to other vehicles in the environment. For example, computing device 500 may compile information about the current state of various conditions or situations within a geographic area (e.g. road blockages, construction, traffic, etc.). In some examples, computing device 500 may maintain a persistent, time-ordered database of information about the conditions or situations by combining data or information (e.g., reports) from individual vehicles in the environment. The vehicles may be autonomously detecting possible issues or situations within the environment and generating information to send back to computing device 500. The vehicles may send sensor data collected from the environment along with the information about the situations encountered by the vehicles. Once the computing device 500 receives the information, the computing device 500 may be configured to provide notifications to the vehicles in the environment about the situation.

Figure 6A:
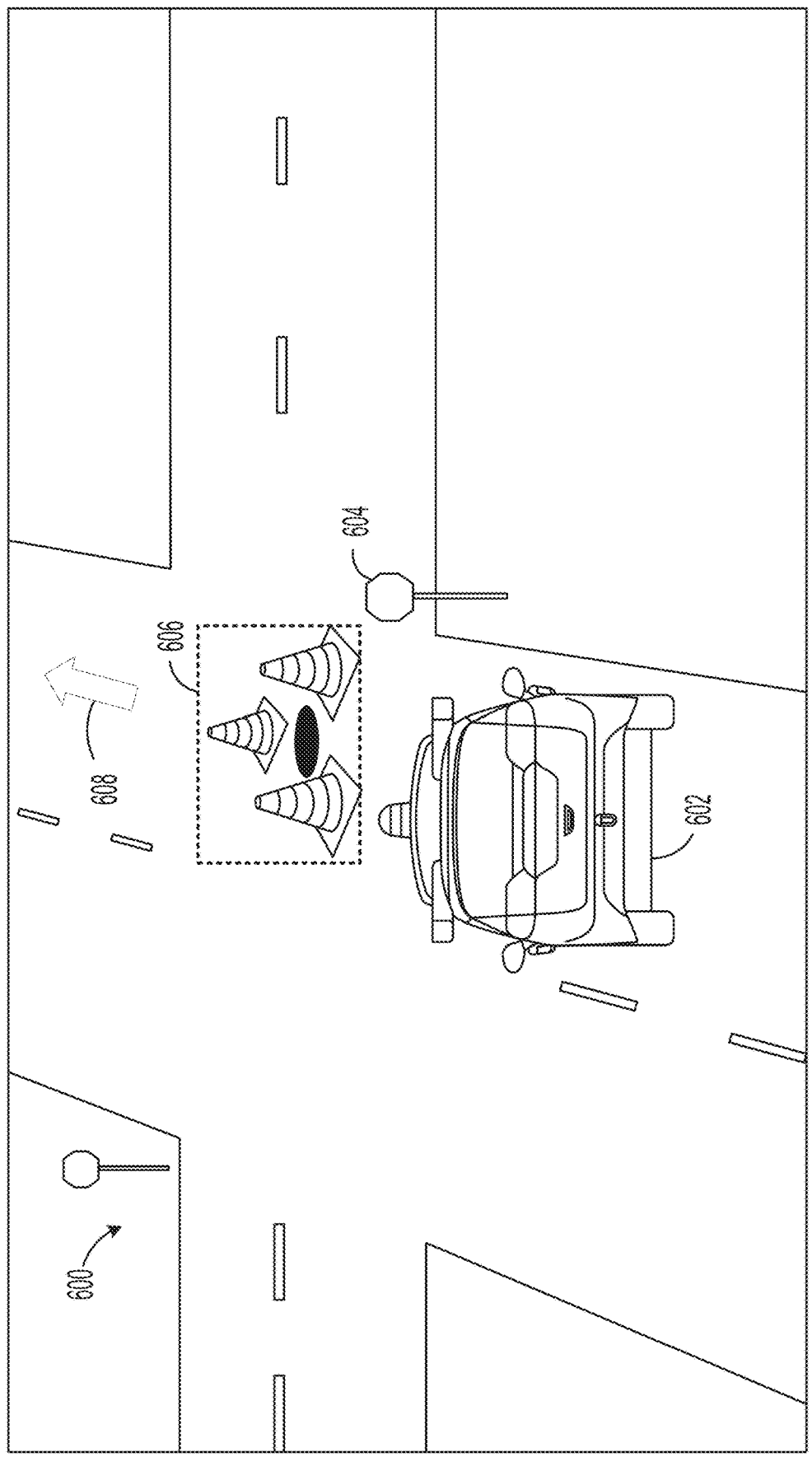
FIG. 6A illustrates a scenario involving a vehicle navigating along a travel route, according to one or more example embodiments.
Figure 6B:
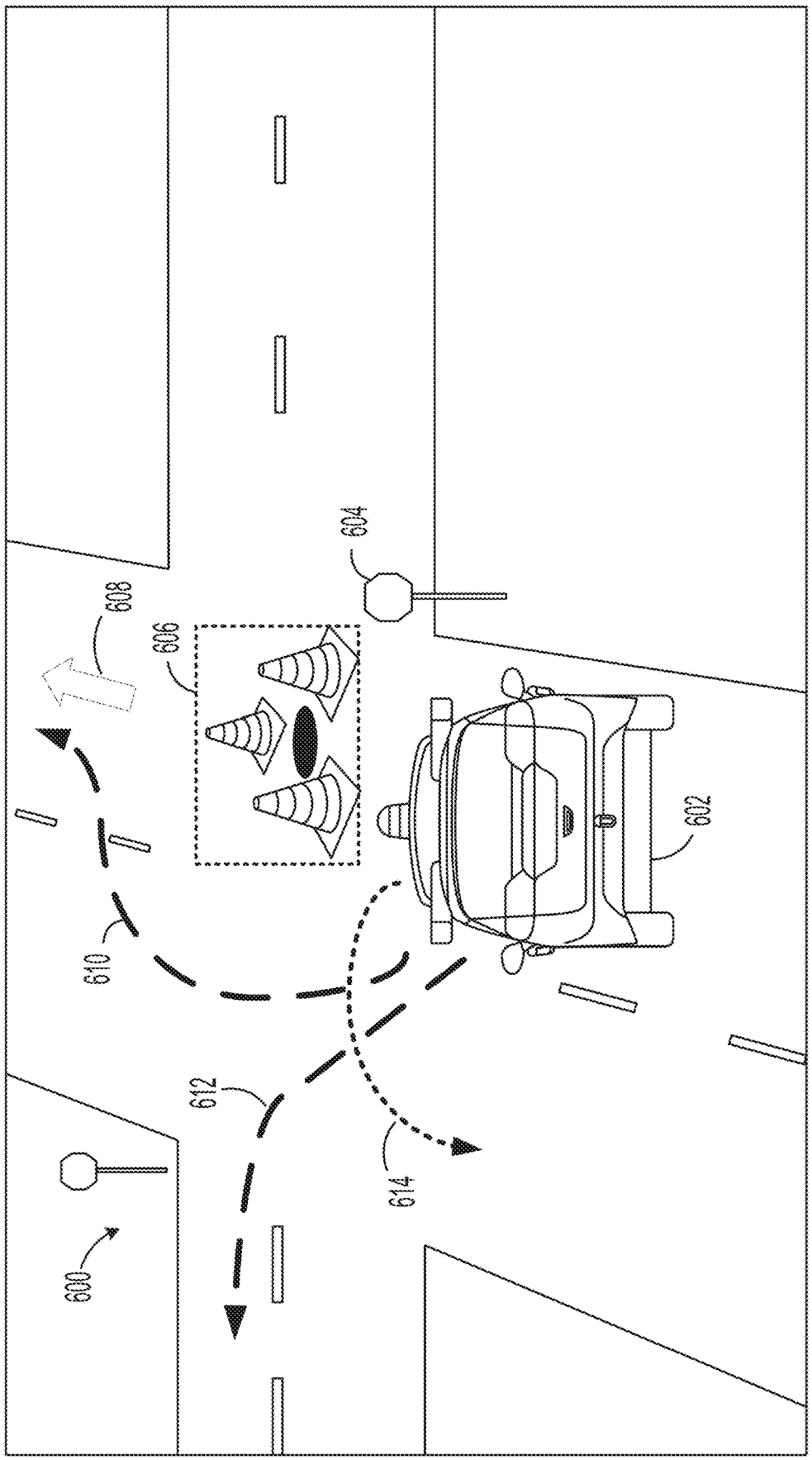
FIG. 6B illustrates navigation options for the vehicle shown in FIG. 6A, according to one or more example embodiments.
Figure 6C:
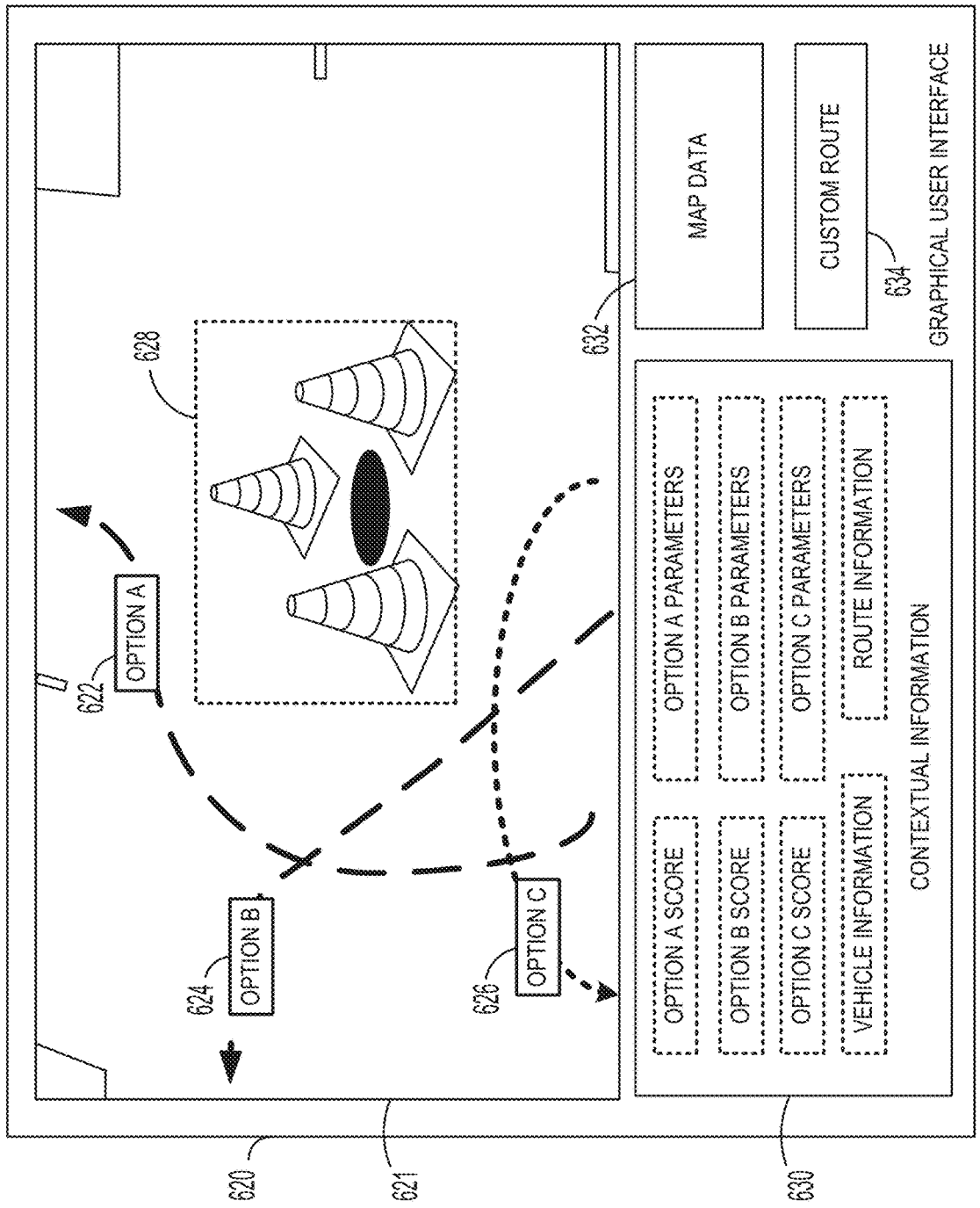
FIG. 6C illustrates graphical user interface for enabling remote assistance for the vehicle shown in FIG. 6A, according to one or more example embodiments.

FIGS. 6A, 6B, and 6C illustrate a scenario encountered by an autonomous vehicle, according to one or more example embodiments. In FIG. 6A, scenario 600 is shown with an environment perspective from the view point from behind vehicle 602. Vehicle 602 may operate in an autonomous mode along a navigation path or travel route within an environment.

During operation, the vehicle may use remote assistance to determine identifications and/or classifications for obstacles or objects encountered along the navigation path. As shown in scenario 600, while the vehicle travels along a roadway approaching a four way intersection with stop sign 604, vehicle 602 may determine that an object 606 is in the vehicle's current navigation path 608. For example, vehicle 602 may determine that object 606 prevents vehicle 602 from navigating straight through the intersection to continue along navigation path 608. The vehicle may not be able to identify the object 606 or may have difficulty identifying the object 606. As such, the vehicle may attempt to classify or identify object 606 and may initially classify object 606 as a pedestrian even though the object is traffic cones and an open manhole. Vehicle 602 may be configured to request remote assistance since the vehicle is unable to accurately determine the identification and/or classification for the object in the environment.

Vehicle 602 may be configured to request remote assistance in order to identify and/or classify the object 606. Vehicle 602 may send information that depicts the situation encountered by vehicle 602 to a remote computing device (e.g., a remote assistant). For example, the information may include a sensor perspective of the environment as measured from the current location of vehicle 602. The sensor perspective may include information and measurements from one or more types of sensors. In some examples, the sensor perspective can be conveyed as a 3D map of the environment generated by the sensor system of the vehicle using one or more types of sensors. The sensor perspective may include images or video from cameras, lidar measurements, radar measurements, GPS measurements, and motion measurements from an inertial measurement unit (IMU), among other options.

In some examples, the request for assistance may additionally include one or more proposed classifications and/or identifications for the object (e.g., object type, object category, etc.). For example, the vehicle may transmit one or more classification options to the remote computing device to obtain input or feedback from an assistant (e.g., a human operator). In one example, the vehicle may send a single suggested or initial identifier for the object (e.g., object type, etc.), and may hold the vehicle's position until a response is received. In other examples, the vehicle may send a set of two or more possible classification options for the assistant to select from. In such examples, the assistant may be able to determine and select a classification for the object. Further, the vehicle may make additional requests for assistance in order to determine how best to proceed based on the classification of the object.

In some situations, the vehicle may identify or classify the object along with a confidence value. The vehicle may request remote assistance when the confidence level of one or more classifications of an object is below a predetermined threshold level. The confidence level may be based on one or more different factors about the vehicle's operation and/or the vehicle's view of the environment. In some embodiments, vehicle 602 may estimate and associate a probability of a correct classification with each classification option, which can be subsequently used by the remote assistant for providing remote assistance.

When the remote computing device receives a request for assistance from the vehicle, the remote computing device may responsively generate a GUI that may allow the assistant or operator to review the situation and provide assistance. For example, the remote computing device may generate a GUI similar to GUI 502 shown in FIG. 5. The GUI may convey sensor data in different arrangements and other information related to the situation (e.g., map data).

FIG. 6B further illustrates vehicle 602 determining a set of navigation options to navigate past obstacle 606 as depicted in scenario 600 illustrated in FIG. 6A, according to one or more example embodiments. Vehicle 602 may determine navigation option 610, navigation option 612, and navigation option 614 in response to detecting the presence of or receiving information about obstacle 606. In some examples, vehicle 602 may determine navigation options 610-614 once the vehicle determines a classification for an object. Vehicle 602 may receive the classification for the object 606 in response to a request for assistance from a remote computing device (e.g., an operator or assistant).

Vehicle 602 may utilize sensor data from one or more types of vehicle sensors to determine each navigation option 610-614. In some examples, vehicle 602 may utilize map/GPS data and/or object classifications (e.g., object type, object category, etc.) to determine each navigation option 610-614. The number of navigation options 610-614 may vary within embodiments and may depend on aspects of the particular scenario. In particular, scenario 600 shown in FIGS. 6A and 6B involves an intersection that may offer alternative routes that vehicle 602 may use to determine navigation options 610-614 as shown. In other scenarios, vehicle 602 may be able to determine more or fewer navigation options depending on the environment. For example, a scenario involving a vehicle navigating within a parking lot may have limited navigation options if there are numerous vehicles parked in the parking lot limiting available navigation routes.

Vehicle 602 may send a request for assistance to the remote computing device that includes navigation options 610-614. For instance, vehicle 602 may transmit a request for assistance to a network configured to receive and subsequently connect vehicle 602 to a remote computing device of an operator available to provide remote assistance. Vehicle 602 may include navigation options 610-614 in an initial request for assistance or may subsequently communicate navigation options 610-614 after establishing a wireless connection with the remote computing device used by the operator.

In some embodiments, vehicle 602 may estimate and associate a score with each navigation option 610-614, which can be subsequently used by the assistant or operator providing assistance via a remote computing device. Each score may depend on various parameters with each navigation option 610-614 and may be used to provide the remote operator with a reference system for comparing navigation options 610-614. In some instances, the score for a given navigation option depends on the maneuver techniques used to complete the navigation option. For example, navigation option 614 may have a lower score than navigation options 610, 612 because navigation option 614 requires vehicle 602 to execute a U-turn. The U-turn may be considered a difficult maneuver technique that requires remote approval prior to execution.

In addition, the score can also depend on the amount a navigation option deviates from the original path (i.e., navigation path 608) of vehicle 602. For example, navigation option 610 may have a higher score than navigation options 612, 614 because navigation option 610 helps vehicle 602 resume navigation path 608 quickly while the other navigation options 612, 614 may result in vehicle 602 taking a longer detour to reach the desired destination. Thus, in some examples, map data can be used to determine scores for each navigation option 610-614. The map data can be used to determine route times and other potential factors that are weighed when determining scores for each navigation option.

The score may also depend on other factors. For instance, each score may depend on whether or not vehicle 602 would need to temporarily reduce the safety buffer maintained around vehicle 602 while navigating to complete a particular navigation option. The longer duration (i.e., period of time) that vehicle 602 may need to reduce its safety buffer to execute a navigation option may reduce that option's score. In addition, when the performance of a navigation option requires vehicle 602 to temporarily break one or more rules of the road, the score associated with that option might be decreased relative to other navigation options that may not require breaking any rules of the road. In some embodiments, the score for each navigation option can be determined based on weighted analysis of multiple factors, such as the maneuver techniques used for each navigation option. For example, vehicle 402 may factor and weigh various parameters to develop a score for each navigation option.

When transmitting options to a remote computing device for assistance, vehicle 602 may provide navigation options 610-614 in various formats. In some examples, vehicle 602 may provide navigation options 610-614 in a visual format, such as virtual representations layered on sensor data as further shown in FIG. 6C.

In some embodiments, vehicle 602 may only convey a top navigation option (e.g., navigation option 610) to the human operator to receive confirmation before proceeding. Limiting the options may accelerate the overall remote assistance process since the human operator has less to review and can approve or modify the proposed option (e.g., navigation option 610). In some instances, vehicle 602 may only convey sensor information (e.g., images or video) of the environment including obstacle 606 and the request for assistance for developing a strategy or identifying obstacle 606. Other variations are possible within examples.

FIG. 6C depicts a GUI for enabling remote assistance for scenario 600 illustrated in FIGS. 6A and 6B. Particularly, a computing device may cause GUI 620 to display on a display interface, such as a touchscreen or a high definition (HD) display similar to computing device 500 displaying GUI 502 as illustrated in FIG. 5. As shown, GUI 620 includes environment representation 621, contextual information 630, map data 632, and custom route 634. In further examples, GUI 620 may further include other options. For instance, GUI 620 may include object classification and/or identification options and a request more information option, which the remote operator can use to obtain additional sensor data or communicate with a passenger.

Environment representation 621 may convey a perspective of the environment based on sensor data obtained from vehicle sensors, such as cameras. In other embodiments, environment representation 621 may display a larger portion of vehicle's 602 environment to provide additional information for the human operator to use to make a decision. For instance, environment representation 621 may utilize a combination of sensor measures from areas around the vehicle to portray vehicle 602 within the environment for the human operator to use when providing remote assistance.

In the embodiment shown in FIG. 6C, GUI 620 shows virtual representation of navigation options as option A 622, option B 624, and option C 626. Particularly, option A 622 is a virtual representation of navigation option 610 determined by vehicle 602, option B 624 is a virtual representation of navigation option 612 determined by vehicle 602, and option C 626 is a virtual representation of navigation option 614 determined by vehicle 602. Each option 622-626 is shown as an overlay on environment representation 621 to show how vehicle 602 may navigate and avoid virtual obstacle 628 representing obstacle 606 as shown in FIG. 6A and FIG. 6B. In some examples, options may be shown in different colors and further segmented to include checkpoints that can enable easier monitoring and modification.

In some examples, GUI 620 may only show one option at a given time. Alternatively, a human operator can customize which options are shown. In addition, GUI 620 may enable an operator to adjust one or more aspects of the options as well as provide custom route 634 for vehicle 602 to perform. Custom route 634 may represent a navigation strategy provided by the human operator tasked with providing remote assistance. For example, a human operator may draw custom route 634 on environment representation 621 or map data 632 to customize the route utilized by vehicle 602. As such, GUI 620 may also include map data 632, which may correspond to one or more maps that represent the current location of vehicle 602. A human operator may use map data 632 to help route plan for a vehicle requesting remote assistance.

In addition, GUI 620 may also include contextual information 630, which can include additional information or data that can help a human operator (or the computing device) provide remote assistance to vehicle 602. In the embodiment shown in FIG. 6C, contextual information 630 includes scores and parameters for each option respectively (i.e., option A 622, option B 624, and option C 626). As discussed above, the parameters associated with performance of an option may influence the score for the option. Particularly, deviation from the desired path (e.g., navigation path 608 shown in FIG. 6A), the difficulty of maneuvers associated with a given option, the time required to complete an option, the quantity and complexity of disfavored maneuvers, and other factors (e.g., how long and the extent of which the vehicle might need to reduce the safety buffer maintained around the vehicle) can impact the score for an option. Contextual information 630 also includes vehicle information and route information. Route information may indicate a current location of vehicle 602 and a target destination (e.g., a location where vehicle 602 is dropping off passengers or objects).

Figure 7:
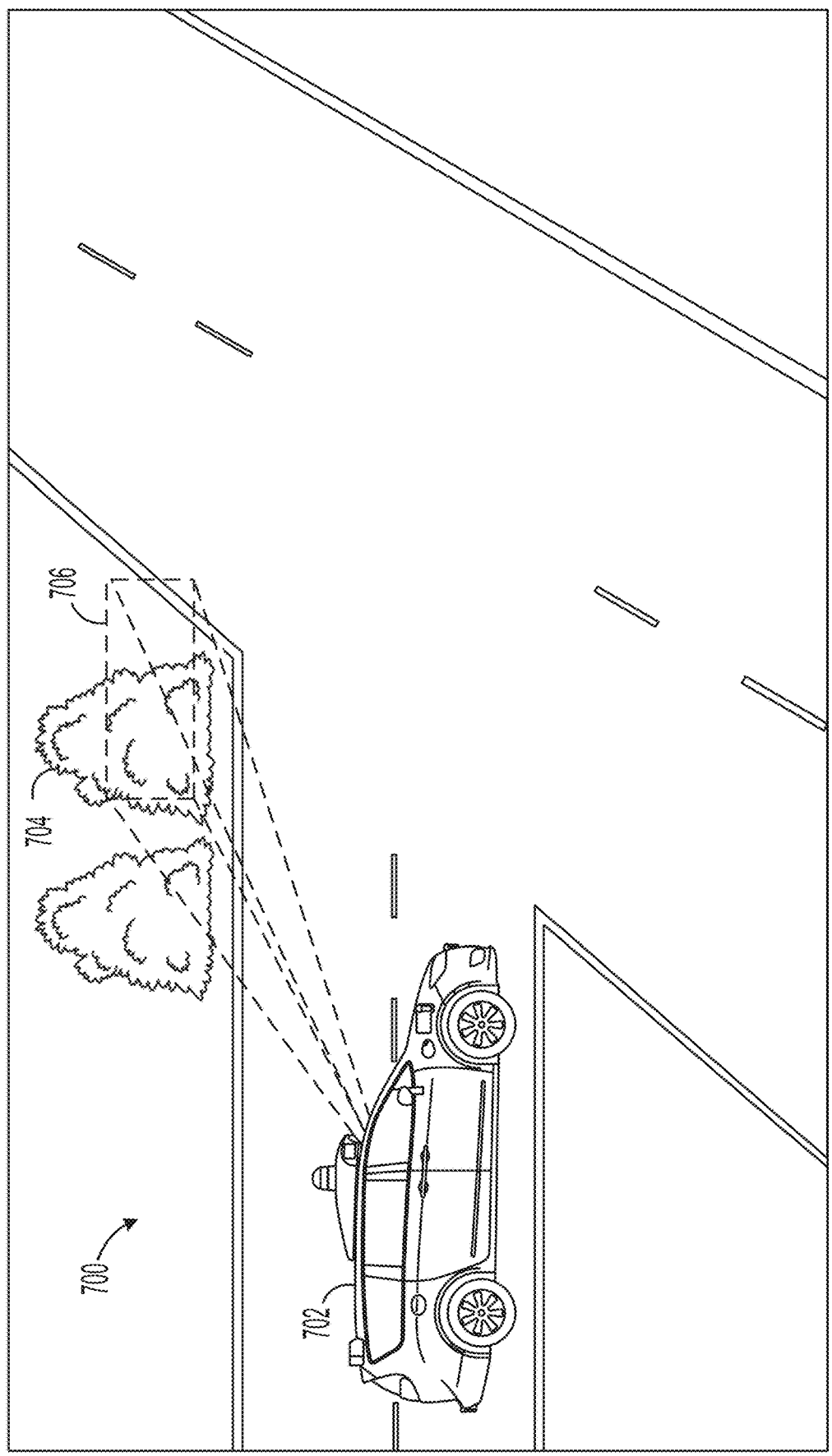
FIG. 7 illustrates another scenario involving a vehicle requesting remote assistance, according to one or more example embodiments.

FIG. 7 illustrates a scenario involving a vehicle identifying and/or classifying objects using remote assistance, according to one or more example embodiments. In FIG. 7, scenario 700 shows vehicle 702 stopped with sensor perspective 706 of an object 704 in the environment. Vehicle 702 may be stopped because the vehicle may not be able to identify object 704 or have difficulty identifying the object 704.

A remote operator may provide remote assistance to vehicle 702. A GUI of a computing device may display images associated with the sensor perspective 706. The images may be two or three dimensional images of a sequence of images or image frames. While viewing the environment that is depicted by the images, the assistant may, via the GUI of the computing device 500, indicate, define, or identify one or more boundaries (e.g., line segments) around particular objects or objects of interest within the image by adding or including a graphical representation (such as a bounding box, one or more lines, and/or other types of visual properties) thereof to the image. In some implementations, the GUI may enable the assistant to select an area of an image that encompasses one or more objects. For example, the GUI may enable a bounding region to be placed or positioned around one or more objects within the image, thereby distinguishing the object from other objects within the image.

The assistant may annotate or label the objects within a bounded region of the images with an object label or identifies. In some examples, the assistant may bulk annotate the objects within the boundary region as associated with an object identifier or label (e.g., static vegetation that is safe to navigate by). Further, the assistant may instruct the remote computing device to annotate objects detected in the boundary region for subsequent images with a particular object identifier (e.g., static vegetation that is safe to navigate by) for a predetermined amount of time. For example, the objects appearing along the roadway may be annotated as, for example, vegetation.

Vehicle 702 may receive instructions from a remote operator that the object 704 is a shrub and may be safe to touch and navigate by. Further, the remote operator may associate the objects within the sensor perspective as an object as described above. As such, vehicle 702 may subsequently be able to continue to navigate safely based on the determination of the object 704.

Figure 8:
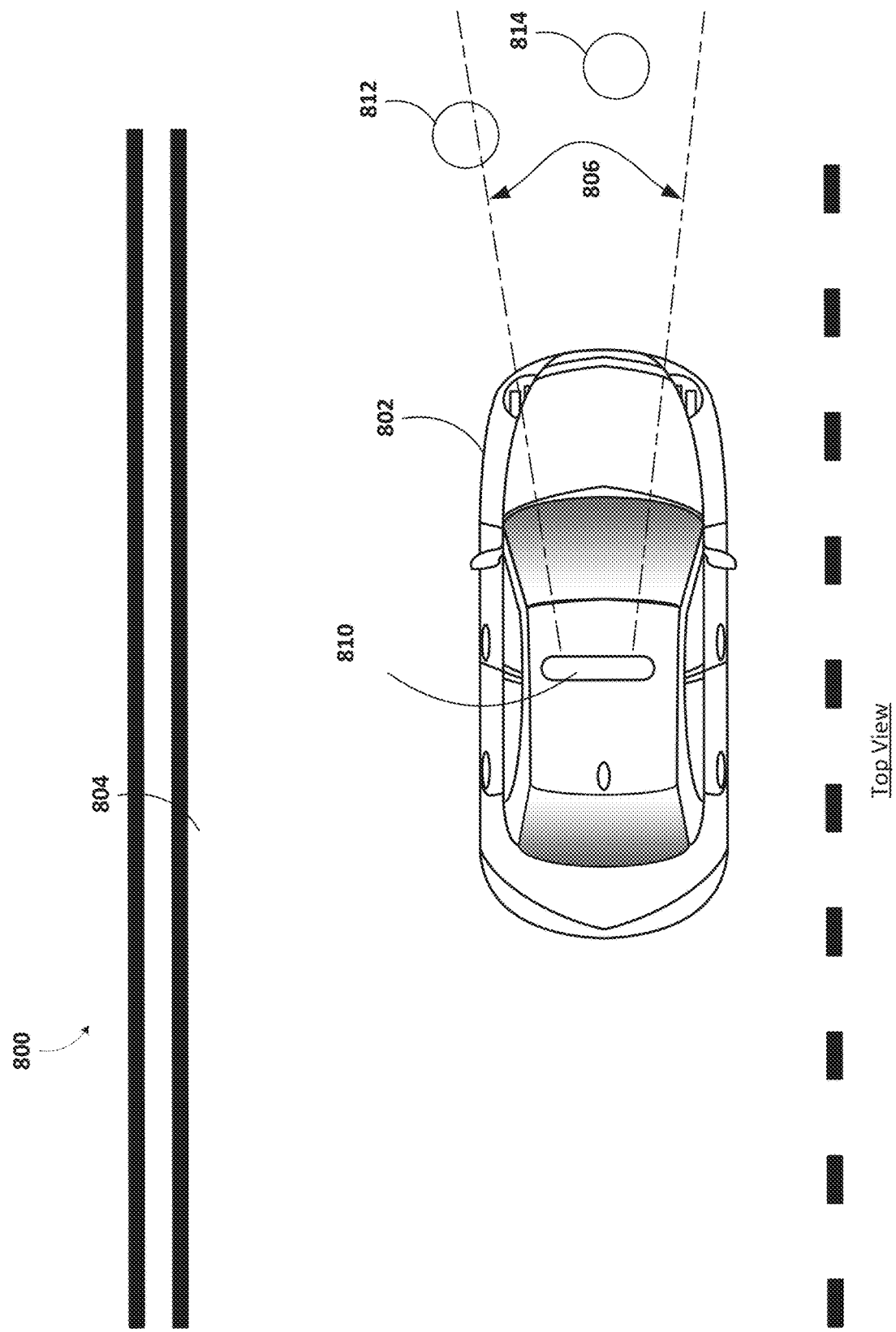
FIG. 8 illustrates a scenario involving a vehicle traveling down a roadway, according to one or more example embodiments.

FIG. 8 illustrates an example scenario 800 involving vehicle 802 traveling down roadway 804. Vehicle 802 may be operating in an autonomous mode and may include sensor unit 810. In some examples, sensor unit 810 may have a sensor, such as a camera, that has a field of view 806. The field of view 806 may correspond to a region of where the camera may be able to capture an image. In other implementations, sensor unit 510 may include a radar unit or a lidar unit. For example, the field of view 806 may correspond to a region over which the radar unit may send and receive signals. Field of view 806 may not be limited to a single region in front of the vehicle, but instead may correspond to the entire region (e.g., 360-degrees) around the vehicle. FIG. 8 illustrates an example scenario 800 in which the sensor unit uses a camera to obtain data about the environment of the vehicle. The description of FIG. 8 can also be used with other sensors and is not limited to optical sensors like a camera.

As one example implementation, as shown in FIG. 8, there may be two environmental objects at least partially within field of view 806 of vehicle 802. In this example, it is assumed that the field of view 806 is that of an optical sensor, such as a camera. The camera of the sensor unit 810 may take a picture or video. This picture video may be analyzed to determine objects of the environment.

When the camera of the sensor unit 810 captures a video or image, object 814 may fall completely within the field of view 806. A second object 812 may only partially be located within the capture picture or video. When a system of vehicle 802 analyzes the picture or video at a first time period, it may be able to identify or classify object 814, such as a first object, and as vehicle 802 continues to approach object 814, vehicle 802 may determine a different classification or identification for object 814 at a second time. When the vehicle determines different classifications for an object, the vehicle may communicate sensor data associated with the captured image or video to a remote assistant or human operator for further processing. When a human operator views the resulting image or video, he or she may be able to successfully classify and/or identify object 814.

When vehicle 802 has a difficult or hard time classifying an object because the sensor data does not include enough information to determine the identification and/or classification of an object, vehicle 802 may identify and/or classify the object but with a low confidence value. For example, object 812 may be a street sign, but an image captured by vehicle 802 may have a portion of the street sign cut off. As such, a sensor system of vehicle 802 may not be able to accurately identify and/or classify the street sign and may provide an identification and/or classification for the object with a low confidence value. When the classification of the object 812 has a low confidence level, vehicle 802 may communicate sensor data representing the object to a remote computing device (e.g., computing device 500 as shown in FIG. 5) for classifying or/and identifying the object.

Figure 9:
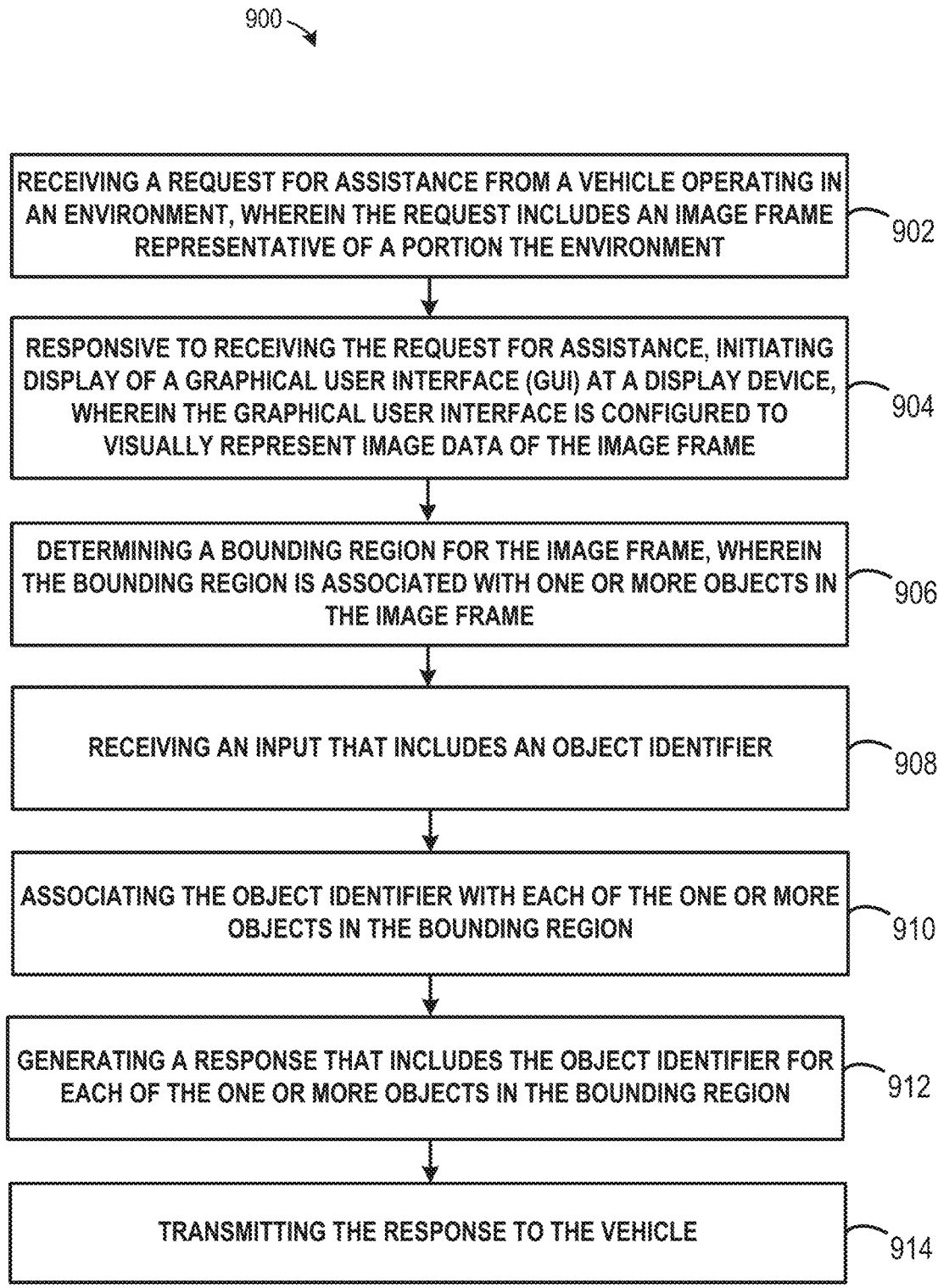
FIG. 9 is a flow chart of a method, according to one or more example embodiments.

FIG. 9 is a flow chart of a method for providing remote assistance to a vehicle, according to example implementations. Method 900 represents an example method that may include one or more operations, functions, or actions, as depicted by one or more of blocks 902-914, each of which may be carried out by any of the systems, devices, and/or vehicles shown in FIGS. 1-8, among other possible systems. For instance, system 500 depicted in FIG. 5 may enable execution of method 900.

Those skilled in the art will understand that the flowchart described herein illustrates functionality and operations of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

At block 902, method 900 involves receiving a request for assistance from a vehicle operating in an environment, wherein the request includes an image frame representative of a portion of the environment. A vehicle (e.g., an autonomous or autonomously driven vehicle (ADV)) may be operating in an autonomous mode in which the vehicle may use a computing device to control the operation of the vehicle with little-to-no human input. For example, a person may enter an address into a system of an autonomous vehicle and determine one or more travel routes to a specified destination. The vehicle may then be able to drive, without further input from the person (e.g., the person does not have to steer or touch the brake/gas pedals), to the specified destination.

During operation, the vehicle may receive information (e.g., sensor data) about objects in the environment. When the vehicle system determines different classifications or identifications for an object or has difficulty determining the classification or identification for the object, the vehicle system may request and obtain remote assistance (e.g., human input) that may help the vehicle classify the object. For example, the vehicle may determine an initial classification for an object in an environment at a first time period and, as the vehicle continues to operate in the environment, the vehicle system may determine a different classification for the object. When the vehicle classifies the object differently, the vehicle may send a request for remote assistance. The vehicle system may also determine a confidence value or level for each of the classifications. The vehicle may request remote assistance if multiple classifications appear to be viable for the object and/or if a confidence value associated with a classification of an object is below a threshold confidence level. For example, the vehicle may determine that at least one object in the environment has a detection confidence below a threshold based on sensor data. As such, the request may provide an indication to the remote assistant that an object has a low detection confidence.

A remotely positioned computing device associated with an assistant (e.g., a human operator) may initially receive a request for assistance from the vehicle operating in an environment. For example, a remote computing device (e.g., a computer assistant or device) may receive an assistance request from a vehicle system for classifying and/or identifying an object. The request may seek to obtain a classification for the object in the environment. The request may include one or more object classifications for the assistant (e.g., a human operator) to review and to select therefrom. For example, the classification for the object may be determined locally by one or more systems of the vehicle and provided to the remote computing device. The request may also provide a score indicative of the probability of a correct classification and/or identification of the object. In some examples, the request may indicate that the vehicle is stopped at a location with a sensor perspective of the environment.

At block 904, method 900 involves initiating display of a graphical user interface (GUI) at a display device, wherein the graphical user interface is configured to visually represent image data of the image frame. Once the remote computing device receives a request for assistance from a vehicle, the remote computing device may provide an interface (e.g., a graphical user interface (GUI)) to present classification options to the assistant (e.g., a human or computer assistant) so that the assistant may review and select therefrom. In some examples, the remote computing device may provide an interface (e.g., GUI) for displaying the sensor perspective of the environment that represents the current state of the vehicle. The interface of the remote computing device may include images or other sensor data to help represent the object or obstacle encountered by the vehicle. Further, the remote computing device may obtain map data based on the location of the vehicle. Using the map data, the remote computing device may display on the interface an elevated view of the vehicle at the location estimated based on the map data and the sensor data. In addition, the interface may represent other information, such as information relating to the vehicle (e.g., location, quantity of passengers, type of vehicle, etc.).

At block 906, method 900 involves determining a bounding region for the image frame, wherein the bounding region is associated with one or more objects in the image frame. A GUI of a computing device may display images associated with a sensor perspective. The images may be two or three dimensional images of a sequence of images or image frames. One or more boundaries (e.g., line segments) may be defined around particular objects or objects of interest within the image by adding or including a graphical representation (such as a bounding box, one or more lines, and/or other types of visual properties) thereof to the image. In some implementations, an area of an image may be selected that encompasses one or more objects. For example, the GUI may enable a bounding region to be placed or positioned around one or more objects within the image, thereby distinguishing the object from other objects within the image.

At block 908, method 900 involves receiving an input that includes one of an object identifier. An interface (e.g., GUI) produced by a remote computing device may enable input from an assistant or operator of the remote computing device. For instance, the remote computing device may cause one or more selectable elements to be displayed such that each selectable element is associated with an object classification. The remote computing device may receive or detect an object identifier when selected by the remote assistant. For example, after presenting identifiers to the remote assistant (e.g., a human or computer assistant), the remote assistant may review and select a classification option associated with the object.

In some examples, objects within a bounded region of an image may be annotated or labeled with an object label or identifier. Further, objects within the boundary region may be bulk annotated as associated with an object identifier or label (e.g., static vegetation that is safe to navigate by). In addition, objects detected in the boundary region for subsequent images may be annotated with a particular object identifier (e.g., static vegetation that is safe to navigate by) for a predetermined amount of time. For example, the objects appearing along the roadway may be annotated as, for example, vegetation.

At block 910, the method 900 involves associating the object identifier with each of the one or more objects in the bounding region. The remote computing device may associate the object identifier with the objects in a bounding region of an image.

At block 912, the method 900 involves generating a response that includes the object identifier for the one or more objects in the bounding region. In response to detecting a selection of an identifier, the remote computing device may generate a response that includes a identifier or label for the object. Further, the response may include one or more instructions for the vehicle and/or other input. In some instances, the remote computing system may determine a command based on input of an assistant. Once the command is determined, it may be communicated to the vehicle. The vehicle may responsively perform the action indicated by the command once it is received.

At block 914, method 900 involves transmitting the response to the vehicle. After generating a response to a request for remote assistance, the remote computing device may send the response to the vehicle. The computing device may transmit the response based on detecting a selection of a selectable option. The computing system may transmit the response over a network so the response is sent to the autonomous vehicle wirelessly. When the vehicle receives the response from the computing device, the vehicle may be configured to perform navigation operation based on the response while also monitoring the environment for changes that may require additional input from the assistant at the remote computing device.

Figure 10:
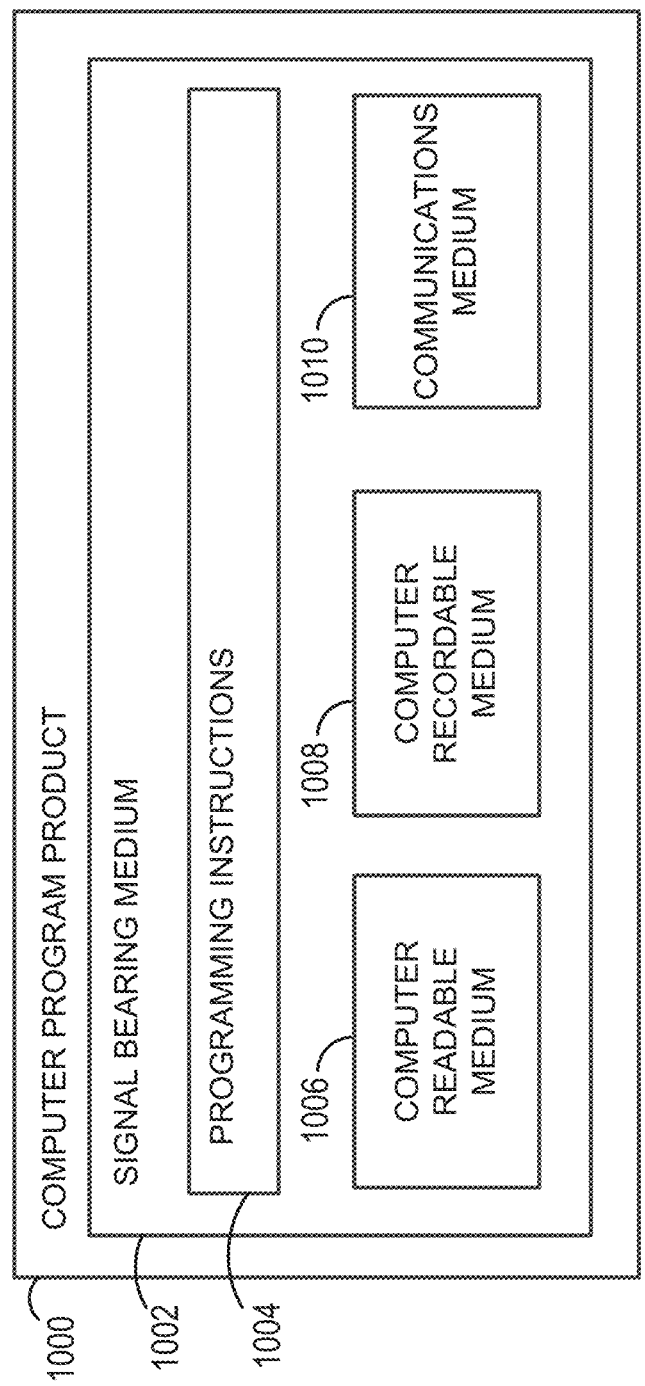
FIG. 10 is a schematic diagram of a computer program, according to one or more example embodiments.

FIG. 10 is a schematic diagram of a computer program, according to an example implementation. In some implementations, the disclosed methods may be implemented as computer program instructions encoded on a non-transitory computer-readable storage media in a machine-readable format, or on other non-transitory media or articles of manufacture.

In the embodiment shown in FIG. 10, computer program product 1000 is provided using signal bearing medium 1002, which may include one or more programming instructions 1004 that, when executed by one or more processors may provide functionality or portions of the functionality described above with respect to FIGS. 1-9.

Signal bearing medium 1002 may encompass a non-transitory computer-readable medium 1006, such as, but not limited to, a hard disk drive, a Compact Disc (CD), a Digital Video Disk (DVD), a digital tape, memory, components to store remotely (e.g., on the cloud) etc. In some implementations, signal bearing medium 1002 may encompass computer recordable medium 1008, such as, but not limited to, memory, read/write (R/W) CDs, R/W DVDs, etc.

In some implementations, signal bearing medium 1002 may encompass communications medium 1010, such as, but not limited to, a digital and/or an analog communication medium (e.g., a fiber optic cable, a waveguide, a wired communications link, a wireless communication link, etc.). Similarly, signal bearing medium 1002 may correspond to a remote storage (e.g., a cloud). A computing system may share information with the cloud, including sending or receiving information. For example, the computing system may receive additional information from the cloud to augment information obtained from sensors or another entity. Thus, for example, signal bearing medium 1002 may be conveyed by a wireless form of communications medium 1010.

One or more programming instructions 1004 may be, for example, computer executable and/or logic implemented instructions. In some examples, a computing device such as computer system 112 shown in FIG. 1 or computing device 300 shown in FIG. 3 may be configured to provide various operations, functions, or actions in response to programming instructions 1004 conveyed to the computer system by one or more of computer readable medium 1006, computer recordable medium 1008, and/or communications medium 1010. The non-transitory computer readable medium could also be distributed among multiple data storage elements and/or cloud (e.g., remotely), which could be remotely located from each other. Computing device that executes some or all of the stored instructions could be a vehicle. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A system comprising:
   a memory configured to store image data;
   a computing device positioned remotely from a plurality of vehicles, wherein the computing device is configured to:
   receive a request for assistance from a vehicle of the plurality of vehicles, wherein the request includes image data representing an unexpected situation that is interfering with a current navigation strategy of the vehicle;
   initiate display, using the image data, of a graphical user interface showing the unexpected situation from a perspective of the vehicle;
   determine and display a bounding region around the unexpected situation, wherein the bounding region is positioned around one or more objects displayed by the graphical user interface;
   receive, via the graphical user interface, an input that includes an object identifier for at least one object in the bounding region;
   associate, based on receiving the input, the object identifier with each of the one or more objects in the bounding region;
   generate a response that includes the object identifier for each of the one or more objects in the bounding region; and
   transmit the response to the vehicle.

2. The system of claim 1, wherein the graphical user interface includes one or more graphical user interface elements to enable an assistant to select the object identifier for the one or more objects.

3. The system of claim 1, wherein the bounding region surrounds the one or more objects, and wherein a shape of the bounding region is substantially rectangular, square, circular, or elliptical.

4. The system of claim 1, wherein the image data represents at least a portion of the environment, and wherein the image data comprises a two-dimensional image or a three-dimensional image.

5. The system of claim 1, wherein the object identifier includes one of an object classification, an object category, an object type, or an identification of the object.

6. The system of claim 1, wherein the computing device is further configured to receive sensor data from at least one sensor coupled to the vehicle, wherein the sensor data provides information corresponding to the object.

7. The system of claim 1, wherein the computing device is further configured to:

receive additional image data, wherein the additional image data is received later in time than the image data;
   maintain the bounding region determined for the image data in the same position on the graphical user interface for the additional image data; and
   associate the object identifier with each object detected in the additional image data within the boundary region.

8. The system of claim 1, wherein the computing device is further configured to:
   maintain the bounding region determined for the first image data in the same position on the graphical user interface for subsequent image data; and
   associate, for a predetermined period of time, the object identifier with each object detected within the bounding region of the subsequent image data.

9. The system of claim 1, wherein the computing device is further configured to associate the object identifier with each object within the boundary region of each image frame of a sequence of image frames in the image data.

10. The system of claim 1, wherein the one or more graphical user interface (GUI) elements include a first GUI element and a second GUI element, wherein the first GUI element is associated with a first object identifier, and wherein the second GUI element is associated with a second object identifier.

11. The system of claim 10, wherein the computing device is further configured to detect input from the first GUI element or the second GUI element and determine the object identifier based on the detection of the input from the first GUI element or the second GUI element.

12. The system of claim 1, wherein the request indicates that the vehicle is stopped for a threshold period of time.

13. A method comprising:
    receiving, at a computing device, a request for assistance from a vehicle operating in an environment, wherein the request includes image data representing an unexpected situation that is interfering with a current navigation strategy of the vehicle, and wherein the computing device is positioned remotely from the vehicle;
    responsive to receiving the request for assistance, initiating, by the computing device, display of a graphical user interface (GUI) showing the unexpected situation from a perspective of the vehicle;
    determining and displaying, at the computing device, a bounding region around the unexpected situation, wherein the bounding region is positioned around one or more objects displayed by the GUI;
    receiving, at the computing device, an input that includes an object identifier for at least one object in the bounding region;
    associating, based on receiving the input, the object identifier with each of the one or more objects in the bounding region;
    generating, at the computing device, a response that includes the object identifier for each of the one or more objects in the bounding region; and
    transmitting the response to the vehicle.

14. The method of claim 1, further comprising creating the bounding box around the one or more objects in a selected portion of the image data.

15. The method of claim 1, further comprising detecting a selection of a graphical user interface element associated with the object identifier.

16. The method of claim 1, wherein the graphical user interface is configured to display the boundary region over the image data, and
    wherein the method further comprises:

associating, for a predetermined period of time, the object identifier with objects detected in the bounding region for subsequent image data.

17. The method of claim 1, further comprising wherein the request includes an initial object identifier determined by the vehicle based on the unexpected situation.

18. The method of claim 1, further comprising:
receiving additional image data, wherein the additional image data is received later in time than the image data;
maintaining the bounding region determined for the image data in the same position on the GUI for the additional image data; and
associating the object identifier with each object detected in the additional image frame within the boundary region.

19. A non-transitory computer-readable medium storing instructions, the instructions being executable by one or more processors to perform operations comprising:
receiving a request for assistance from a vehicle operating in an environment, wherein the request includes image data representing an unexpected situation that is interfering with a current navigation strategy of the vehicle;
responsive to receiving the request for assistance, initiating display of a graphical user interface showing the unexpected situation from a perspective of the vehicle;
determining and displaying a bounding region around the unexpected situation, wherein the bounding region is positioned around one or more objects displayed by the graphical user interface;
receiving an input that includes an object identifier for at least one object in the bounding region;
associating, based on receiving the input, the object identifier with each of the one or more objects in the bounding region;
generating a response that includes the object identifier for each of the one or more objects in the bounding region; and
transmitting the response to the vehicle.

20. The system of claim 1, wherein the computing device is further configured to:
generating the response with instructions for the vehicle to assign the object identifier to a plurality of objects detected within a predetermined amount of time.

* * * * *